United States Patent
Liu

(10) Patent No.: US 11,166,337 B2
(45) Date of Patent: Nov. 2, 2021

(54) METHOD AND APPARATUS FOR CELLULAR INTERNET OF THINGS (CIOT) DATA TRANSFER OVER A CONTROL PLANE IN A WIRELESS COMMUNICATION SYSTEM

(71) Applicant: Nokia Technologies Oy, Espoo (FI)

(72) Inventor: Jennifer J-N. Liu, Plano, TX (US)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/837,047

(22) Filed: Apr. 1, 2020

(65) Prior Publication Data

US 2020/0323020 A1 Oct. 8, 2020

Related U.S. Application Data

(60) Provisional application No. 62/833,334, filed on Apr. 12, 2019, provisional application No. 62/828,223, filed on Apr. 2, 2019.

(51) Int. Cl.
*H04W 76/27* (2018.01)
*H04W 76/30* (2018.01)
(Continued)

(52) U.S. Cl.
CPC .......... *H04W 76/27* (2018.02); *H04L 67/14* (2013.01); *H04L 69/322* (2013.01); *H04W 8/08* (2013.01);
(Continued)

(58) Field of Classification Search
None
See application file for complete search history.

(56) References Cited

U.S. PATENT DOCUMENTS

2017/0048112 A1\* 2/2017 Ronneke ................ H04L 41/12
2018/0376444 A1 12/2018 Kim et al.
(Continued)

FOREIGN PATENT DOCUMENTS

WO 2018/174516 A1 9/2018

OTHER PUBLICATIONS

3GPP TS 24.301 version 16.0.0, Mar. 2017 (Year: 207).\*
(Continued)

*Primary Examiner* — Jamaal Henson
(74) *Attorney, Agent, or Firm* — Alston & Bird LLP

(57) ABSTRACT

A method, apparatus, and computer program product are provided for control plane cellular Internet of Things (CIoT) data transfer in a wireless communication system. A method for control plane messaging between a first entity and a second entity in a network in which control plane messages are sent in a control plane protocol is described. The method can include a service request procedure whereby the 5GMM mode is changed from 5GMM-IDLE to 5GMM-CONNECTED mode. In some embodiments, if a user equipment is using EPS services with control plane CIoT EPS optimization, this procedure can be used for UE initiated transfer of user data via the control plane. In some embodiments, the method can include receiving from a user equipment (UE), at a core access and mobility management function, a control plane service request message, starting a T3517 timer and enter the state 5GMM-SERVICE-REQUEST-INITIATED, and changing a 5GMM mode from a 5GMM-IDLE mode to a 5GMM-CONNECTED mode.

16 Claims, 20 Drawing Sheets

(51) Int. Cl.
  *H04L 29/08* (2006.01)
  *H04W 80/10* (2009.01)
  *H04W 8/08* (2009.01)
  *H04W 68/00* (2009.01)

(52) U.S. Cl.
  CPC ......... *H04W 68/005* (2013.01); *H04W 76/30* (2018.02); *H04W 80/10* (2013.01)

(56) References Cited

U.S. PATENT DOCUMENTS

2019/0053034 A1   2/2019   Kim et al.
2019/0116631 A1*  4/2019   Talebi Fard .......... H04W 68/02

OTHER PUBLICATIONS

3GPP TS 24.201 Version. 16.0.2 (Mar. 2019) (Year: 2017).*
3GPP TS 24.301 Version 16.0.0 Mar. 2017 (Year: 2017).*
3GPP TS 24.201 Version 16.0.2 (Year: 2017).*
"3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2(Release 15)", 3GPP TS 36.300, V15.4.0, Dec. 2018, pp. 1-363.
"3rd Generation Partnership Project;Technical Specification Group Core Network and Terminals;Non-Access-Stratum (NAS) protocol for Evolved Packet System (EPS); Stage 3 (Release 15)", 3GPP TS 24.301, V15.6.0, Mar. 2019, pp. 1-539.
"5G; Non-Access-Stratum (NAS) protocol for 5G System (5GS); Stage 3", ETSI TS 124.501, V15.1.0, Oct. 2018, 406 pages.
"3rd Generation Partnership Project;Technical Specification Group Services and System Aspects;Procedures for the 5G System; Stage 2 (Release 16)", 3GPP TS 23.502, V16.3.0, Dec. 2019, pp. 1-558.
"Idle mode optimizations for 5G Control plane CIoT small data transfer", 3GPP TSG-CT WG1 Meeting #119, C1-195127, Aug. 26-30, 2019, 27 pages.
"5GS Control plane CIoT data transfer for UE in connected mode", 3GPP TSG-CT WG1 Meeting #120, C1-196576, Oct. 7-11, 2019, 19 pages.
International Search Report and Written Opinion received for corresponding Patent Cooperation Treaty Application No. PCT/FI2020/050204, dated Jul. 3, 2020, 13 pages.
"3rd Generation Partnership Project; Technical Specification Group Core Network and Terminals; Non-Access-Stratum (NAS) protocol for 5G System (5GS); Stage 3; (Release 16)", 3GPP TS 24.501, V16.0.0, Mar. 2019, pp. 1-480.
"3rd Generation Partnership Project; Technical Specification Group Core Network and Terminals; Non-Access-Stratum (NAS) protocol for Evolved Packet System (EPS); Stage 3 (Release 16)", 3GPP TS 24.301, V16.0.0, Mar. 2019, pp. 1-540.
"3rd Generation Partnership Project; Technical Specification Group Services and System Aspects; Procedures for the 5G System; Stage 2 (Release 16)", 3GPP TS 23.502, V16.0.0 , Mar. 2019, pp. 1-420.

* cited by examiner

METHOD AND APPARATUS FOR CELLULAR INTERNET OF THINGS (CIOT) DATA TRANSFER OVER A CONTROL PLANE IN A WIRELESS COMMUNICATION SYSTEM

CROSS-REFERENCE TO RELATED APPLICATIONS

This application claims priority to, and the benefit of, U.S. Provisional Patent Application No. 62/828,223, filed Apr. 2, 2019, entitled "Method and Apparatus for Cellular Internet of Things (CIoT) Data Transfer over a Control Plane in a Wireless Communication System" and claims priority to, and the benefit of, U.S. Provisional Patent Application No. 62/833,334, filed Apr. 12, 2019, entitled "Method And Apparatus For Cellular Internet of Things (CIoT) Data Transfer Over A Control Plane In A Wireless Communication System," the entire disclosures of each of which are hereby incorporated herein by reference in their entireties for all purposes.

TECHNICAL FIELD

An example embodiment relates generally to wireless communication systems, particularly to control plane Cellular Internet of Things (CIoT) data transfer in wireless communication systems.

BACKGROUND

In addition to traditional wireless communications systems and telecommunications services, fifth-generation (5G) systems are expected to support emerging use cases such as Internet of Things (IoT) and Cellular IOT (CIoT) technologies, vehicle-to-vehicle/-infrastructure communication, tactile Internet, smart buildings, sensor networks, and the like.

Currently there is no solution for supporting control plane CIoT data transfer under planned 5G systems and protocols. Such solutions are required to enable user data transfer via control plane over 5G connections/systems.

BRIEF SUMMARY

A method, apparatus and computer program product are provided in accordance with an example embodiment for control plane cellular Internet of Things (CIoT) data transfer in a wireless communication system. A method for control plane messaging between a first entity and a second entity in a network in which control plane messages are sent in a control plane protocol is described. The method can include a service request procedure whereby the 5GMM mode is changed from 5GMM-IDLE to 5GMM-CONNECTED mode. In some embodiments, if a user equipment is using EPS services with control plane CIoT EPS optimization, this procedure can be used for UE initiated transfer of user data via the control plane. In some embodiments, the method can include receiving from a user equipment (UE), at a core access and mobility management function, a control plane service request message, starting a T3517 timer and enter the state 5GMM-SERVICE-REQUEST-INITIATED, and changing a 5GMM mode from a 5GMM-IDLE mode to a 5GMM-CONNECTED mode.

A method (e.g., a method of control plane messaging between a first entity and a second entity in a network in which control plane messages are sent in a control plane protocol) according to some embodiments of the present disclosure can include receiving from a user equipment (UE), at a core access and mobility management function, a control plane service request message, starting a T3517 timer and entering a state as 5GMM-SERVICE-REQUEST-INITIATED, and changing a 5GMM mode from a 5GMM-IDLE mode to a 5GMM-CONNECTED mode. In some embodiments, the method can further include initiating transfer of user data via a control plane. In some embodiments, the control plane service request message is received from user equipment (UE) in response to at least one of i) the UE is in a 5GMM-CONNECTED mode over a 3GPP access and receives a paging request from the core access and mobility management function; ii) the UE, in 5GMM-CONNECTED mode over 3GPP access, receives a notification from the network with access type indicating non-3GPP access; iii) the UE, in 5GMM-IDLE mode over 3GPP access, has uplink signalling pending; iv) the UE, in 5GMM-IDLE mode over 3GPP access, has uplink user data pending; v) the UE, in 5GMM-CONNECTED mode or in 5GMM-CONNECTED mode with RRC inactive indication, has user data pending due to no user-plane resources established for PDU session(s) used for user data transport; v) the UE in 5GMM-IDLE mode over non-3GPP access, receives an indication from the lower layers of non-3GPP access, that the access stratum connection is established between UE and network; vi) the UE, in 5GMM-IDLE mode over 3GPP access, receives a notification from the network with access type indicating 3GPP access when the UE is in 5GMM-CONNECTED mode over non-3GPP access; vii) the UE, in 5GMM-IDLE, 5GMM-CONNECTED mode over 3GPP access, or 5GMM-CONNECTED mode with RRC inactive indication, receives a request for emergency services fallback from the upper layer and performs emergency services fallback; or viii) the UE, in 5GMM-CONNECTED mode over 3GPP access or in 5GMM-CONNECTED mode with RRC inactive indication, receives a fallback indication from the lower layers and or the UE has a pending NAS procedure other than a registration, service request, or de-registration procedure.

An apparatus according to some embodiments of the present disclosure can include at least one processor and at least one memory storing computer program code, the at least one memory and the computer program code configured to, with the processor, cause the apparatus to receive from a user equipment (UE), at a core access and mobility management function, a control plane service request message, start a T3517 timer and enter a state as 5GMM-SERVICE-REQUEST-INITIATED, and change a 5GMM mode from a 5GMM-IDLE mode to a 5GMM-CONNECTED mode. In some embodiments, the at least one memory and the computer program code are further configured to, with the processor, cause the apparatus to initiate transfer of user data via a control plane. In some embodiments, the control plane service request message is received from the UE in response to at least one of i) the UE is in a 5GMM-CONNECTED mode over a 3GPP access and receives a paging request from the core access and mobility management function; ii) the UE, in 5GMM-CONNECTED mode over 3GPP access, receives a notification from the network with access type indicating non-3GPP access; iii) the UE, in 5GMM-IDLE mode over 3GPP access, has uplink signalling pending; iv) the UE, in 5GMM-IDLE mode over 3GPP access, has uplink user data pending; v) the UE, in 5GMM-CONNECTED mode or in 5GMM-CONNECTED mode with RRC inactive indication, has user data pending due to no user-plane resources established for PDU session(s) used for user data transport; v) the UE in 5GMM- IDLE mode over non-3GPP access, receives an indication from the lower layers of non-3GPP access, that the access stratum connection is established between UE and network; vi) the UE, in 5GMM-IDLE mode over 3GPP access, receives a notification from the network with access type indicating 3GPP access when the UE is in 5GMM-CONNECTED mode over non-3GPP access; vii) the UE, in 5GMM-IDLE, 5GMM-CONNECTED mode over 3GPP access, or 5GMM-CONNECTED mode with RRC inactive indication, receives a request for emergency services fallback from the upper layer and performs emergency services fallback; or viii) the UE, in 5GMM-CONNECTED mode over 3GPP access or in 5GMM-CONNECTED mode with RRC inactive indication, receives a fallback indication from the lower layers and or the UE has a pending NAS procedure other than a registration, service request, or de-registration procedure.

An apparatus according to some embodiments of the present disclosure can include means, such as an apparatus including a core access and mobility management function and/or a processor and a memory storing computer program code, for receiving from a user equipment (UE), a control plane service request message, starting a T3517 timer and entering a state as 5GMM-SERVICE-REQUEST-INITIATED, and changing a 5GMM mode from a 5GMM-IDLE mode to a 5GMM-CONNECTED mode. In some embodiments, the apparatus can further include means for initiating transfer of user data via a control plane. In some embodiments, the control plane service request message can be received from the UE in response to at least one of i) the UE is in a 5GMM-CONNECTED mode over a 3GPP access and receives a paging request from the core access and mobility management function; ii) the UE, in 5GMM-CONNECTED mode over 3GPP access, receives a notification from the network with access type indicating non-3GPP access; iii) the UE, in 5GMM-IDLE mode over 3GPP access, has uplink signalling pending; iv) the UE, in 5GMM-IDLE mode over 3GPP access, has uplink user data pending; v) the UE, in 5GMM-CONNECTED mode or in 5GMM-CONNECTED mode with RRC inactive indication, has user data pending due to no user-plane resources established for PDU session(s) used for user data transport; v) the UE in 5GMM-IDLE mode over non-3GPP access, receives an indication from the lower layers of non-3GPP access, that the access stratum connection is established between UE and network; vi) the UE, in 5GMM-IDLE mode over 3GPP access, receives a notification from the network with access type indicating 3GPP access when the UE is in 5GMM-CONNECTED mode over non-3GPP access; vii) the UE, in 5GMM-IDLE, 5GMM-CONNECTED mode over 3GPP access, or 5GMM-CONNECTED mode with RRC inactive indication, receives a request for emergency services fallback from the upper layer and performs emergency services fallback; or viii) the UE, in 5GMM-CONNECTED mode over 3GPP access or in 5GMM-CONNECTED mode with RRC inactive indication, receives a fallback indication from the lower layers and or the UE has a pending NAS procedure other than a registration, service request, or de-registration procedure.

A computer program product according to some embodiments of the present disclosure can include a non-transitory computer-readable storage medium having stored thereon computer-readable code, which, when executed by at least one processor, causes the at least one processor to receive from a user equipment (UE), at a core access and mobility management function, a control plane service request message, start a T3517 timer and enter a state as 5GMM-SERVICE-REQUEST-INITIATED, and change a 5GMM mode from a 5GMM-IDLE mode to a 5GMM-CONNECTED mode. In some embodiments, execution of the computer-readable code by the at least one processor further causes the at least one processor to initiate transfer of user data via a control plane. In some embodiments, the control plane service request message can be received from the UE in response to at least one of i) the UE is in a 5GMM-CONNECTED mode over a 3GPP access and receives a paging request from the core access and mobility management function; ii) the UE, in 5GMM-CONNECTED mode over 3GPP access, receives a notification from the network with access type indicating non-3GPP access; iii) the UE, in 5GMM-IDLE mode over 3GPP access, has uplink signalling pending; iv) the UE, in 5GMM-IDLE mode over 3GPP access, has uplink user data pending; v) the UE, in 5GMM-CONNECTED mode or in 5GMM-CONNECTED mode with RRC inactive indication, has user data pending due to no user-plane resources established for PDU session(s) used for user data transport; v) the UE in 5GMM-IDLE mode over non-3GPP access, receives an indication from the lower layers of non-3GPP access, that the access stratum connection is established between UE and network; vi) the UE, in 5GMM-IDLE mode over 3GPP access, receives a notification from the network with access type indicating 3GPP access when the UE is in 5GMM-CONNECTED mode over non-3GPP access; vii) the UE, in 5GMM-IDLE, 5GMM-CONNECTED mode over 3GPP access, or 5GMM-CONNECTED mode with RRC inactive indication, receives a request for emergency services fallback from the upper layer and performs emergency services fallback; or viii) the UE, in 5GMM-CONNECTED mode over 3GPP access or in 5GMM-CONNECTED mode with RRC inactive indication, receives a fallback indication from the lower layers and or the UE has a pending NAS procedure other than a registration, service request, or de-registration procedure.

In some embodiments, a method can be provided for control plane messaging between a first entity and a second entity in a network in which control plane messages are sent in a control plane protocol, the method comprising: sending from a user equipment (UE) to a core access and mobility management function (AMF), a control plane service request message; starting a T3517 timer and entering a service request initiated state; and changing a mode of the UE from an idle mode to a connected mode. In some embodiments, the method can further comprise: initiating transfer of user data, from the UE to the AMF, via a control plane. In some embodiments, the user data comprises cellular internet-of-things (CIoT) user data in a CIoT user data container, stored within a payload. In some embodiments, the method can further comprise: including one or more protocol data unit (PDU) session identifications and one or more release assistance indications in the payload; indicating a payload container type in a payload container type information element (IE) of the payload, wherein the payload container type is a CIoT user data container type; indicating the payload container type to a user data container of the payload; and sending an uplink non-access stratum transport message to the AMF. In some embodiments, the control plane service request message is sent from the UE to the AMF in response to either: the UE being in the connected mode over 3GPP access and the UE receiving a paging request from the AMF, the UE being in the connected mode over 3GPP access and receiving a notification from the AMF with an access type indicating non-3GPP access, the UE being in the idle mode over 3GPP access and having uplink signalling pending, the UE being in the idle mode over 3GPP access and having uplink user data pending, the UE being in the connected mode, or in the connected mode with a radio resource control (RRC) inactive indication, and having uplink user data pending due to no user-plane resources being established for one or more protocol data unit (PDU) sessions used for user data transport, the UE being in the idle mode over non-3GPP access and receiving an indication from lower layers of the non-3GPP access, wherein an access stratum connection is established between the UE and the AMF, the UE being in the idle mode over 3GPP access and receiving a notification from the AMF with access type indicating 3GPP access when the UE is in the connected mode over non -3GPP access, or the UE being in the idle mode, in the connected mode over 3GPP access, or in the connected mode with the RRC inactive indication, and in response to receiving a request for emergency services fallback from one or more upper layers of the 3GPP access. In some embodiments, the control plane service request message is sent from the UE to the AMF in response to the UE being in the idle mode, in the connected mode over 3GPP access, or in the connected mode with the RRC inactive indication, and in response to receiving the request for emergency services fallback from the one or more upper layers of the 3GPP access, wherein the method further comprises: performing emergency services fallback. In some embodiments, the control plane service request message is sent from the UE to the AMF in response to the UE being in the connected mode over 3GPP access or in the connected mode with a radio resource control (RRC) inactive indication, and in response to the UE receiving a fallback indication from one or more lower layers of the 3GPP access, or when the UE has a pending NAS procedure other than a registration procedure, a service request procedure, or a de-registration procedure.

In some embodiments, a method can be provided for control plane messaging between entities in a network in which control plane messages are sent according to a control plane protocol, the method comprising: receiving, from a user equipment (UE) or a session management function (SMF), at a core access and mobility management function (AMF), a control plane service request message; and, in an instance in which the AMF determines, based upon the control plane service request message, that the UE satisfies one or more conditions, sending, by the AMF, to the UE or the SMF, a service accept message. In some embodiments, the method can further comprise: receiving, at the AMF, from the UE or SMF, user data via a control plane; and initiating, based upon the control plane service request message and the user data, an authentication and key agreement procedure or an extensible authentication protocol. In some embodiments, the user data comprises cellular internet-of-things (CIoT) user data in a CIoT user data container, stored within a payload. In some embodiments, the payload further comprises one or more protocol data unit (PDU) session identifications and one or more release assistance indications in the payload, wherein a payload container type is indicated in a payload container type information element (IE) of the payload as being a CIoT user data container type, and wherein the payload container type is indicated to a user data container of the payload, the method further comprising: receiving, from the UE, an uplink non-access stratum transport message. In some embodiments, the method can further comprise: identifying a PDU session routing context for the UE and the PDU session identification; and forwarding the PDU session routing context of a payload container IE towards a session management function (SMF) identified by the PDU session routing context. In some embodiments, the method can further comprise: in an instance in which a release assistance indication IE is included in the uplink non-access stratum transport message received from the UE, a downlink data expected (DDX) field of the release assistance indication IE indicates that no further uplink and no further downlink data transmission subsequent to the uplink data transmission is expected, and there is no downlink signalling or downlink data for the UE, initiating release of a connection and mobility management (N1) interface on a non-access stratum signaling connection.

In some embodiments, an apparatus can be provided that comprises at least one processor and at least one memory storing computer program code, the at least one memory and the computer program code configured to, with the at least one processor, cause the apparatus to: send, to a core access and mobility management function (AMF), a control plane service request message; start a T3517 timer and enter a service request initiated state; and change a mode of the apparatus from an idle mode to a connected mode. In some embodiments, the at least one memory and the computer program code are further configured to, with the at least one processor, cause the apparatus to: initiate transfer of user data, to the AMF, via a control plane, wherein said user data comprises cellular internet-of-things (CIoT) user data in a CIoT user data container, stored within a payload. In some embodiments, the at least one memory and the computer program code are further configured to, with the at least one processor, cause the apparatus to: include one or more protocol data unit (PDU) session identifications and one or more release assistance indications in the payload; indicate a payload container type in a payload container type information element (IE) of the payload, wherein the payload container type is a CIoT user data container type; indicate the payload container type to a user data container of the payload; and send an uplink non-access stratum transport message to the AMF.

In some embodiments, an apparatus can be provided that comprises at least one processor and at least one memory storing computer program code, the at least one memory and the computer program code configured to, with the at least one processor, cause the apparatus to: receive, from a user equipment (UE) or a session management function (SMF), at the apparatus, a control plane service request message; and, in an instance in which the apparatus determines, based upon the control plane service request message, that the UE satisfies one or more conditions, send, to the UE or the SMF, a service accept message. In some embodiments, the at least one memory and the computer program code are further configured to, with the at least one processor, cause the apparatus to: receive, from the UE or SMF, user data via a control plane; and initiate, based upon the control plane service request message and the user data, an authentication and key agreement procedure or an extensible authentication protocol, wherein said user data comprises cellular internet-of-things (CIoT) user data in a CIoT user data container, stored within a payload.

In some embodiments, a computer program product can be provided that comprises a non-transitory computer-readable storage medium having stored thereon computer-readable code, which, when executed by at least one processor, causes the at least one processor to: send, from a user equipment (UE), to a core access and mobility management function, a control plane service request message; start a T3517 timer and enter a service request initiated state; and change a mode of the UE from an idle mode to a connected mode.

In some embodiments, a computer program product can be provided that comprises a non-transitory computer-readable storage medium having stored thereon computer-readable code, which, when executed by at least one processor, causes the at least one processor to: receive, from a user equipment (UE) or a session management function (SMF), at a core access and mobility management function (AMF), a control plane service request message; and, in an instance in which the AMF determines, based upon the control plane service request message, that the UE satisfies one or more conditions, cause the AMF to send, to the UE or the SMF, a service accept message.

BRIEF DESCRIPTION OF THE DRAWINGS

Figure 1:
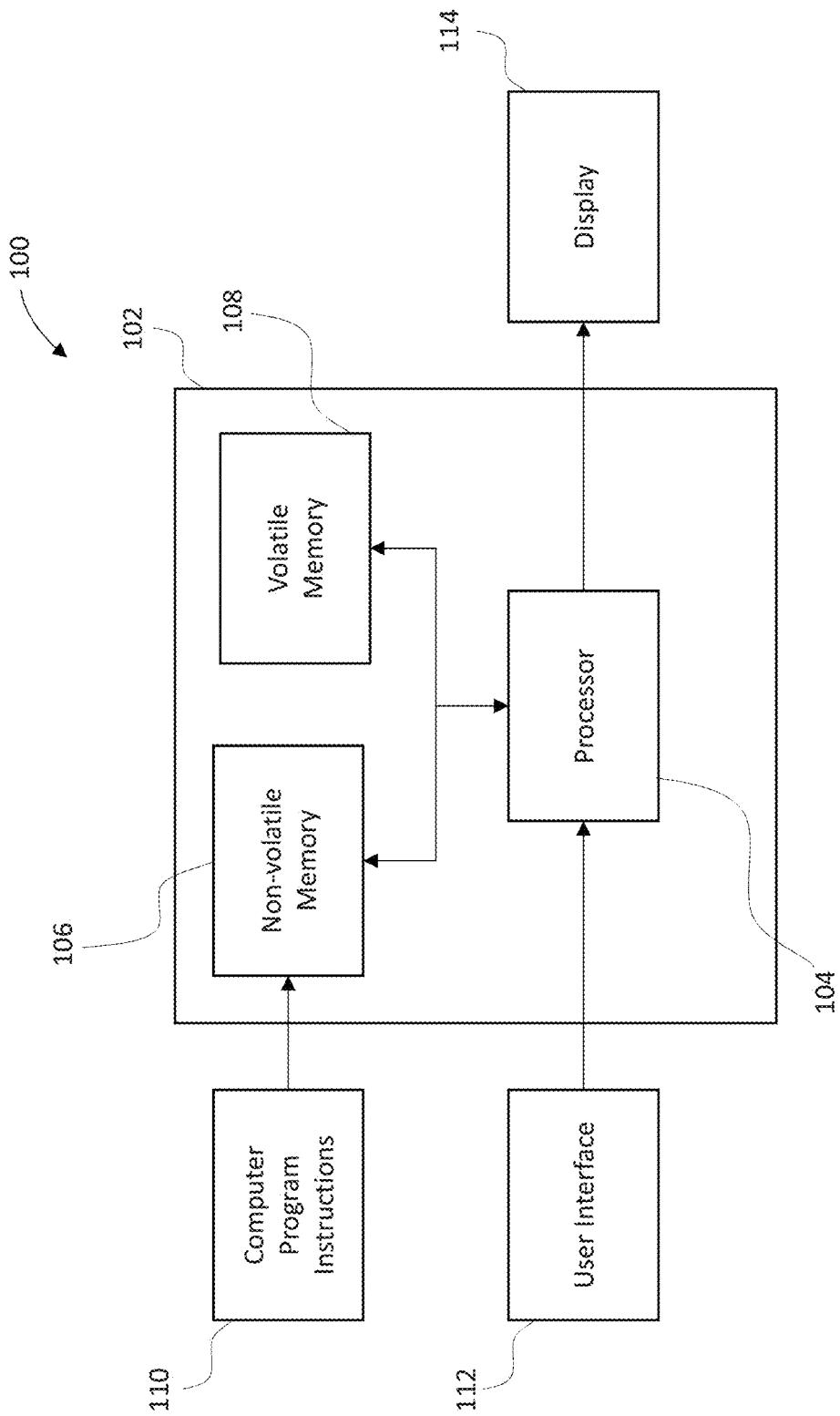
Figure 2:
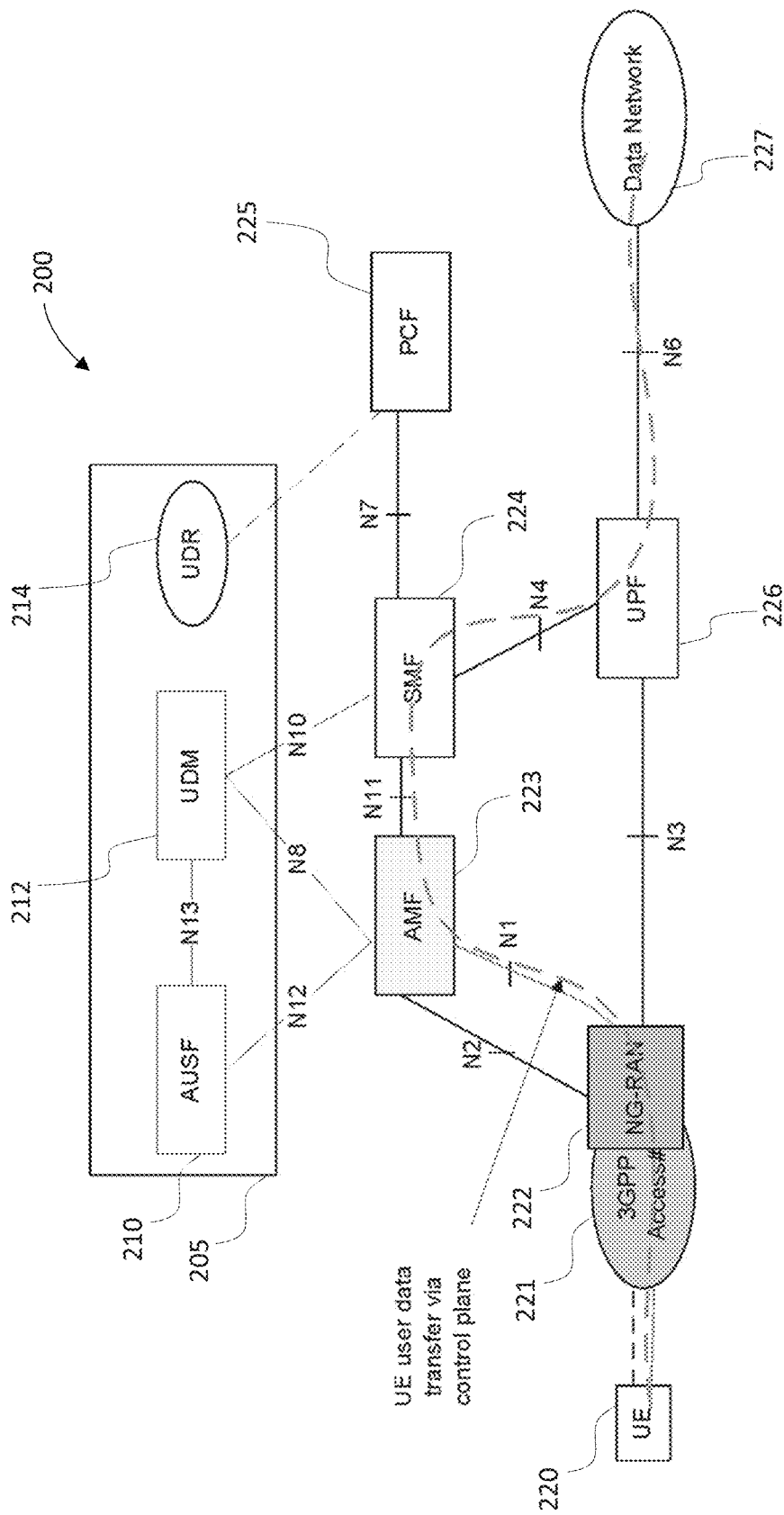
Figure 3:
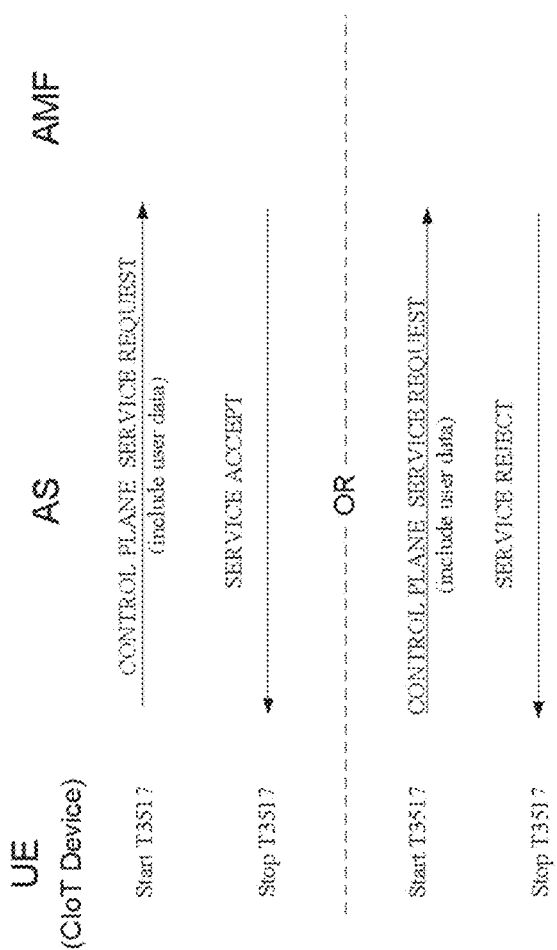
Figure 4:
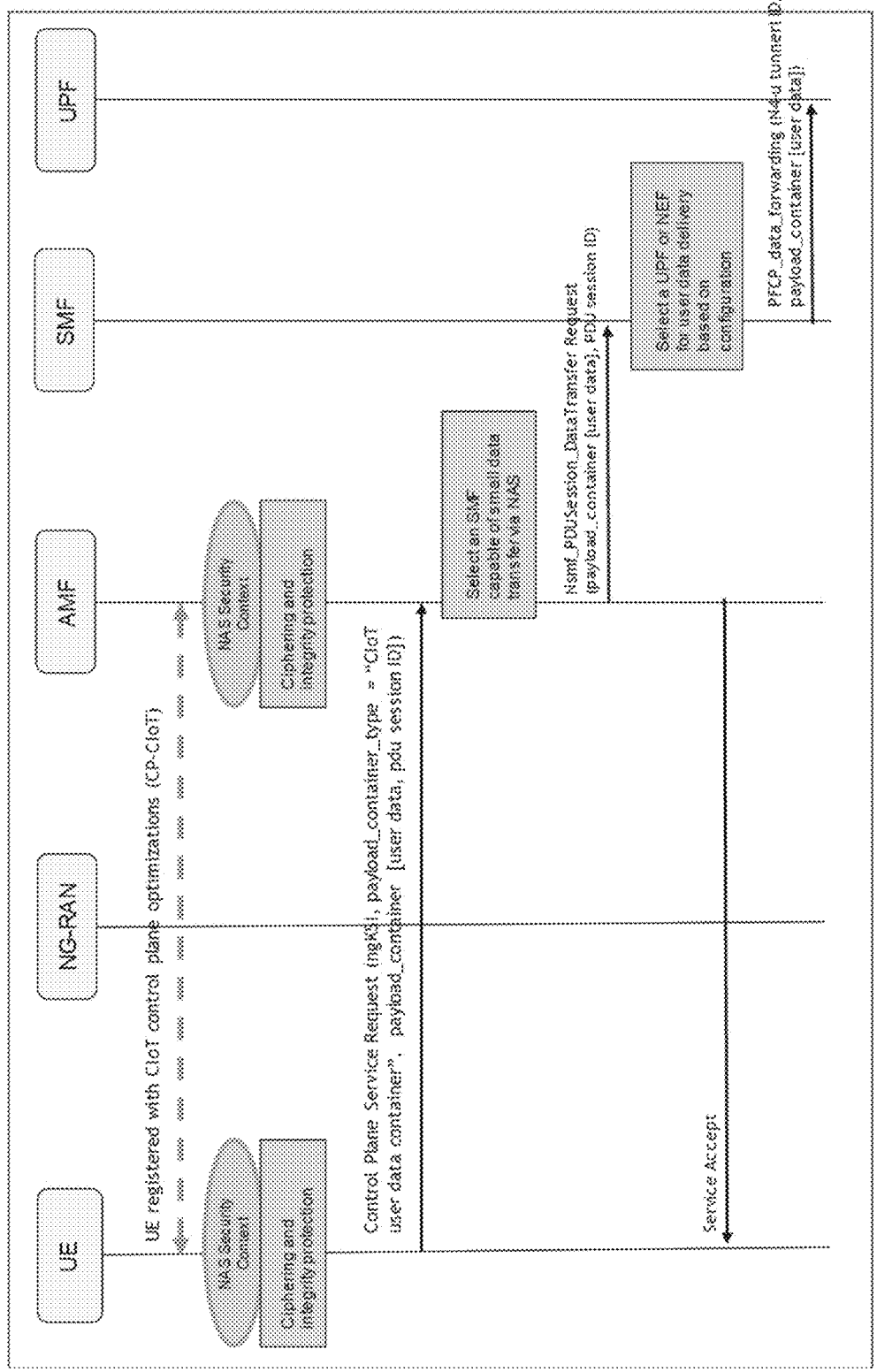
Figure 5:
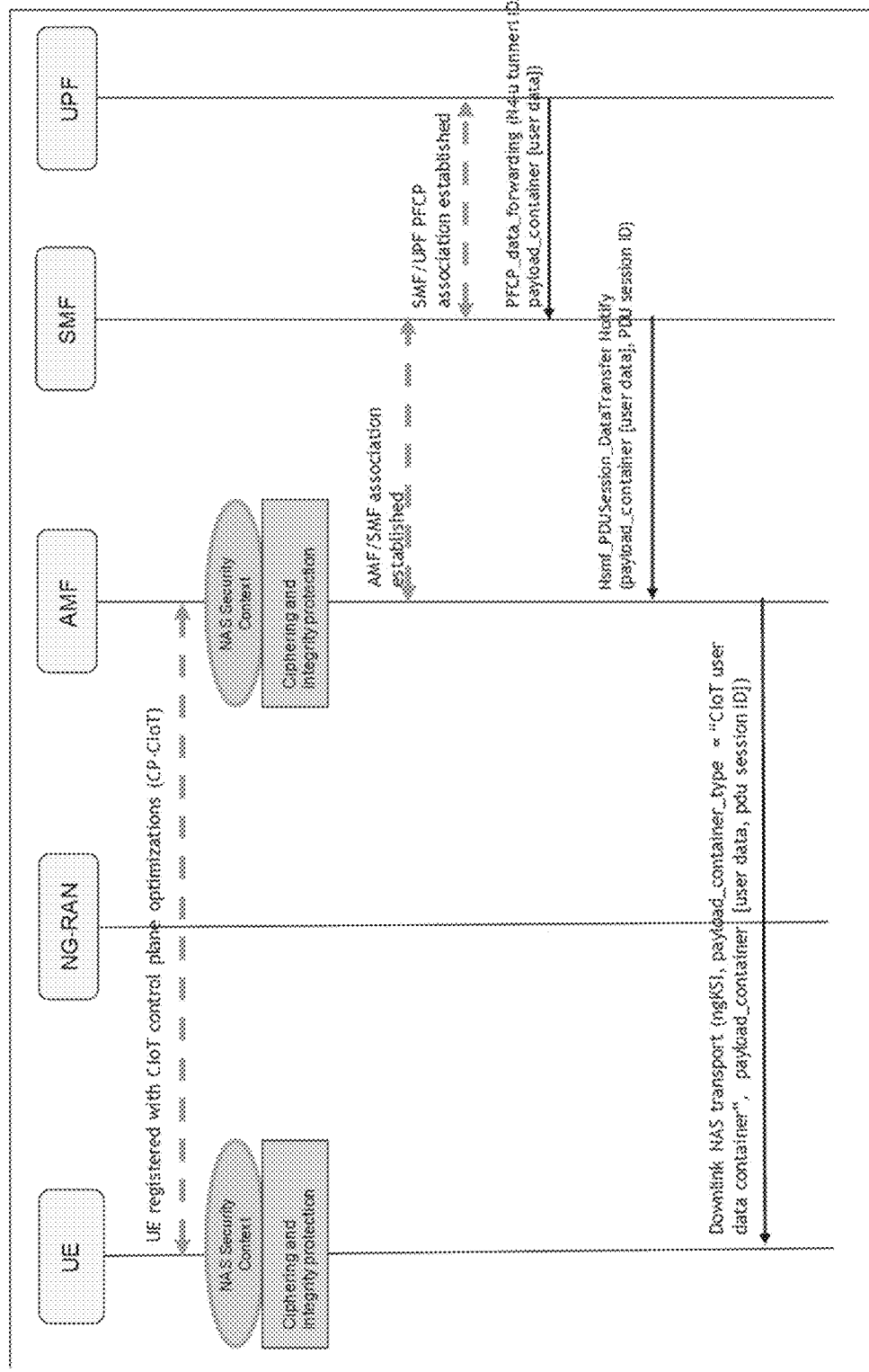
Figure 6:
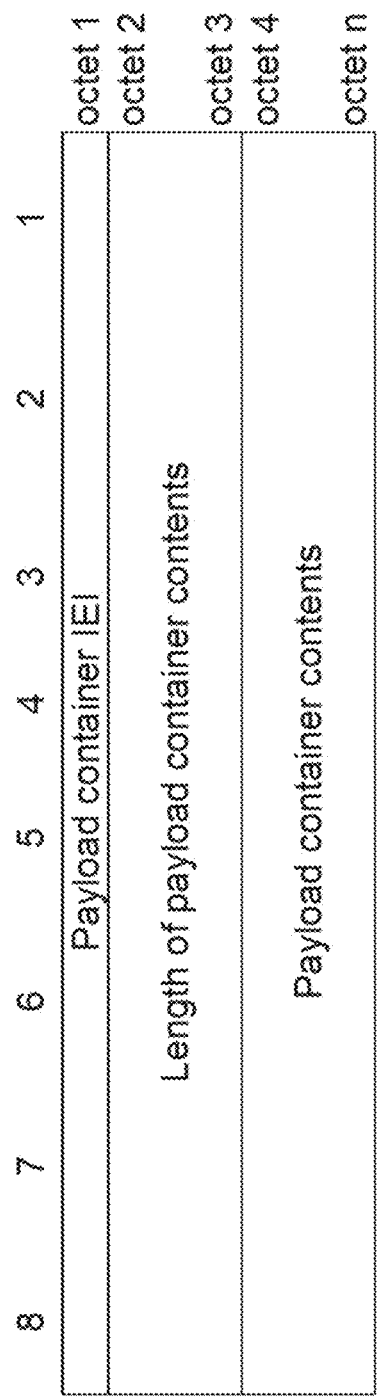
Figure 7:
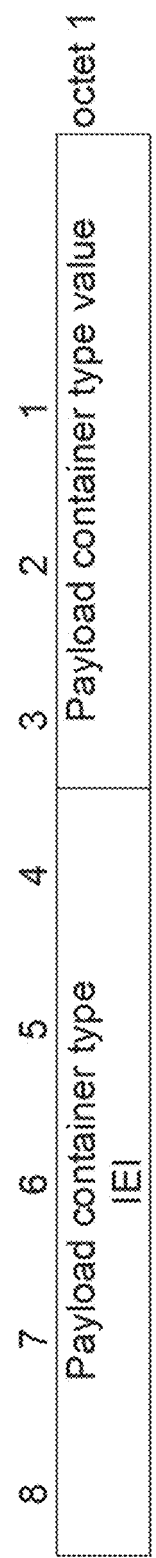
Figure 8:
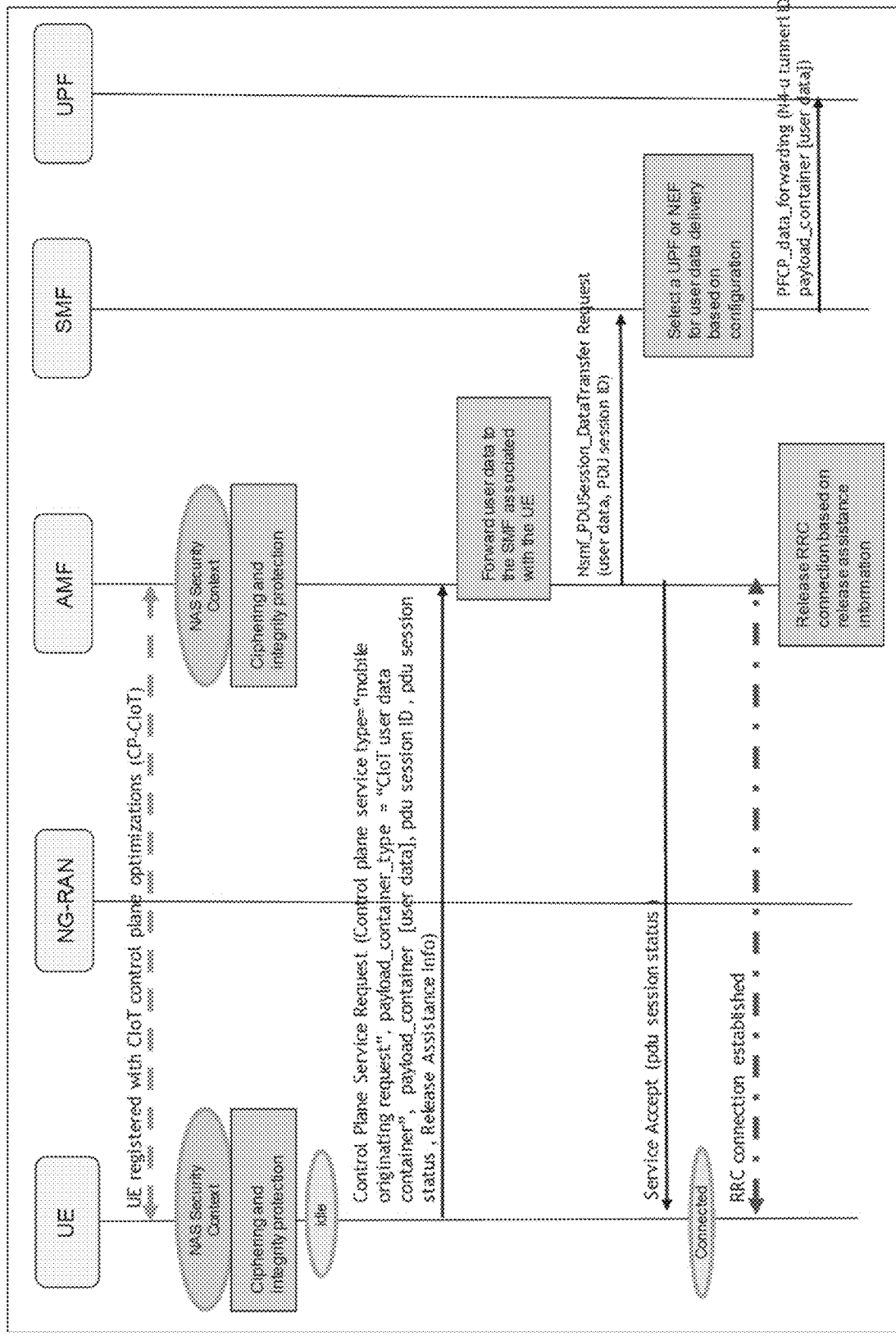
Figure 9:
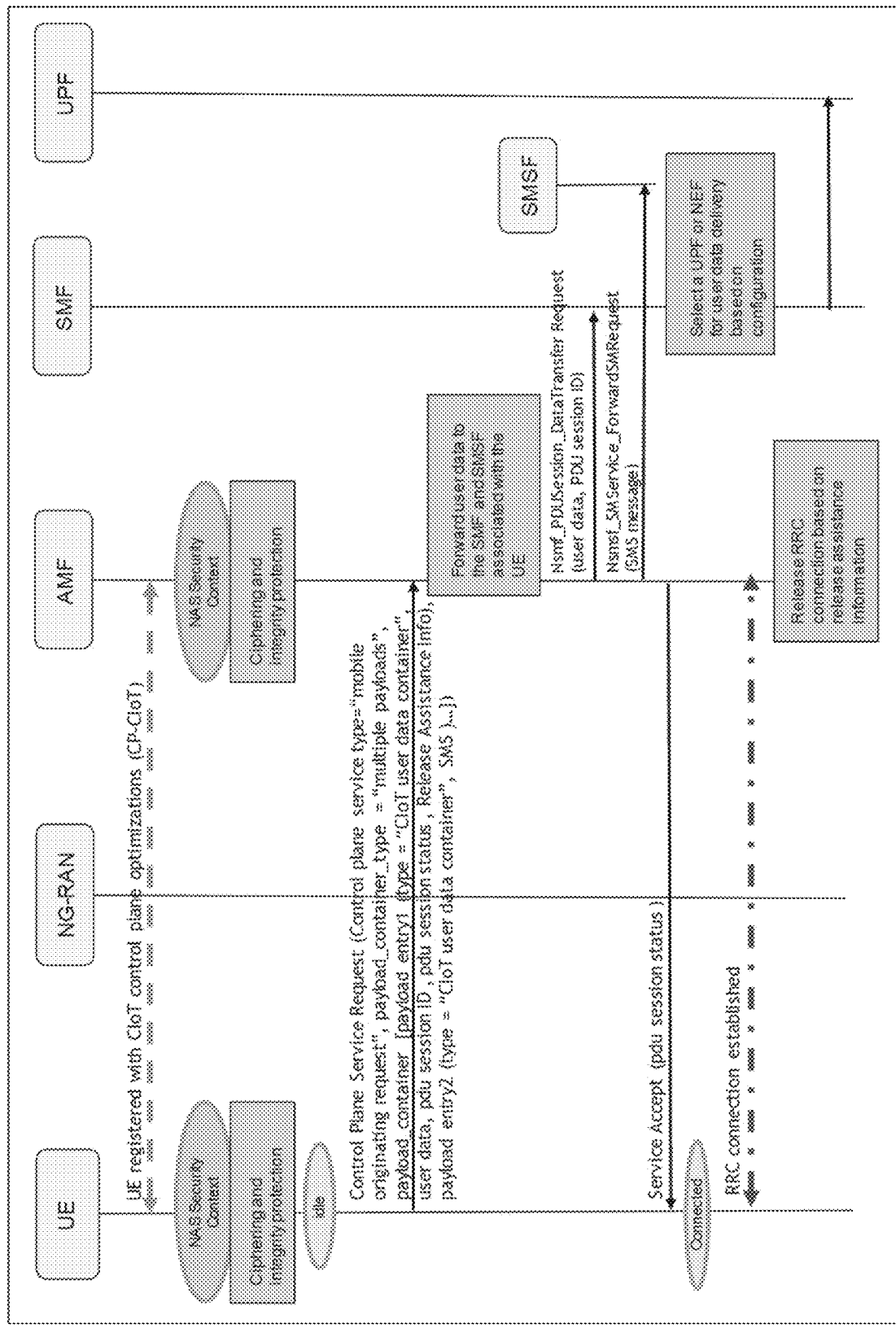
Figure 10:
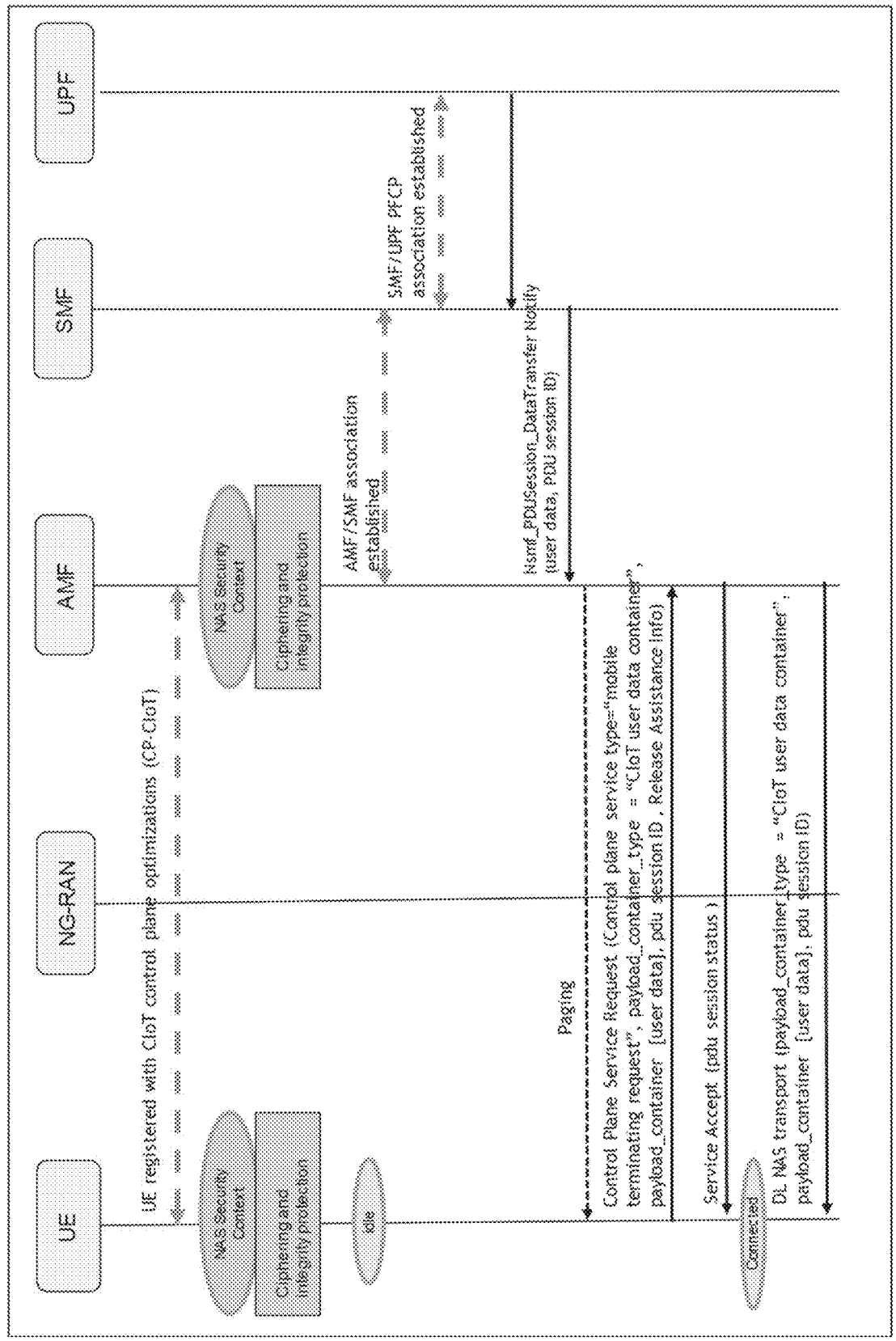
Figure 11:
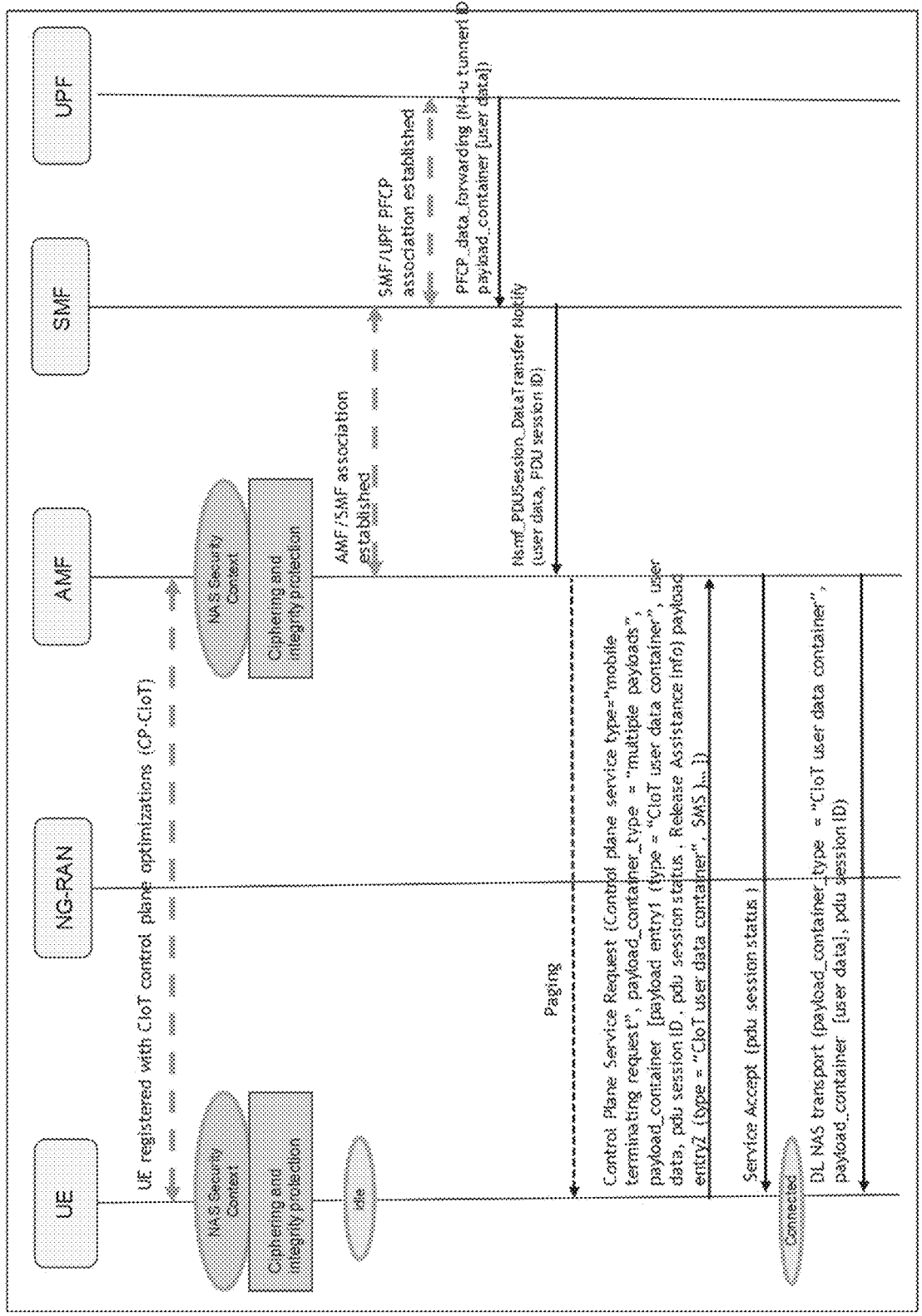
Figure 12:
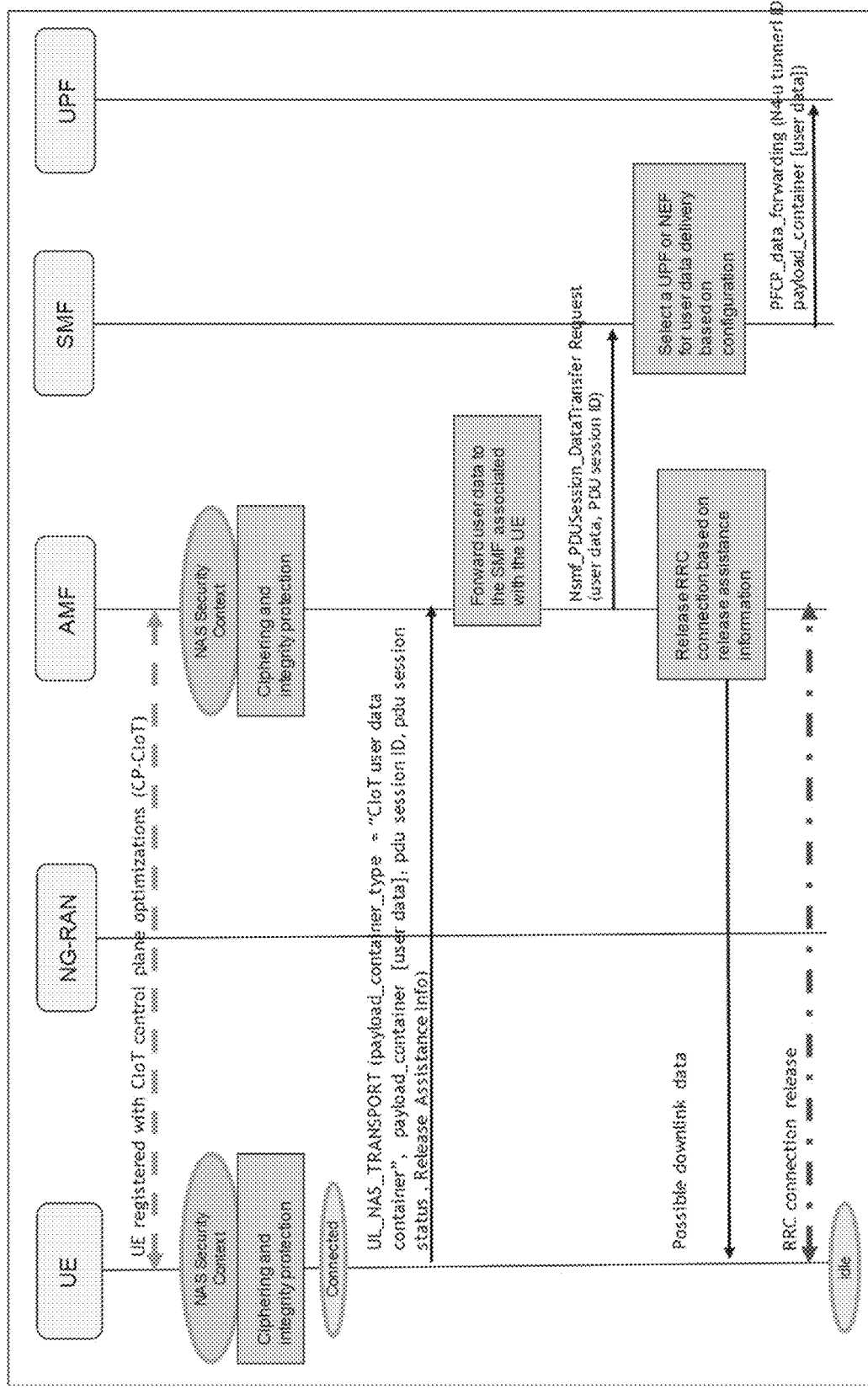
Figure 13:
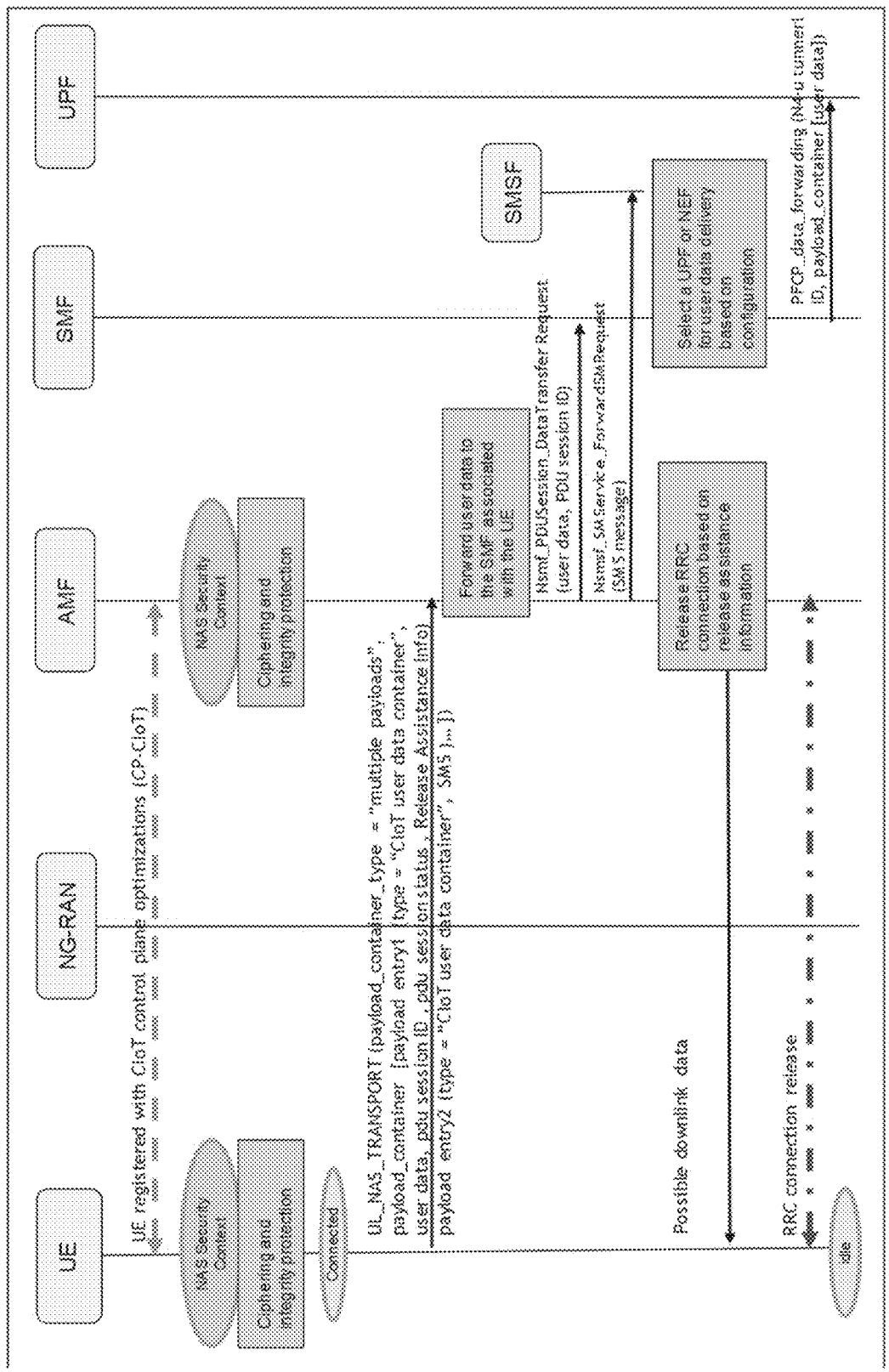
Figure 14:
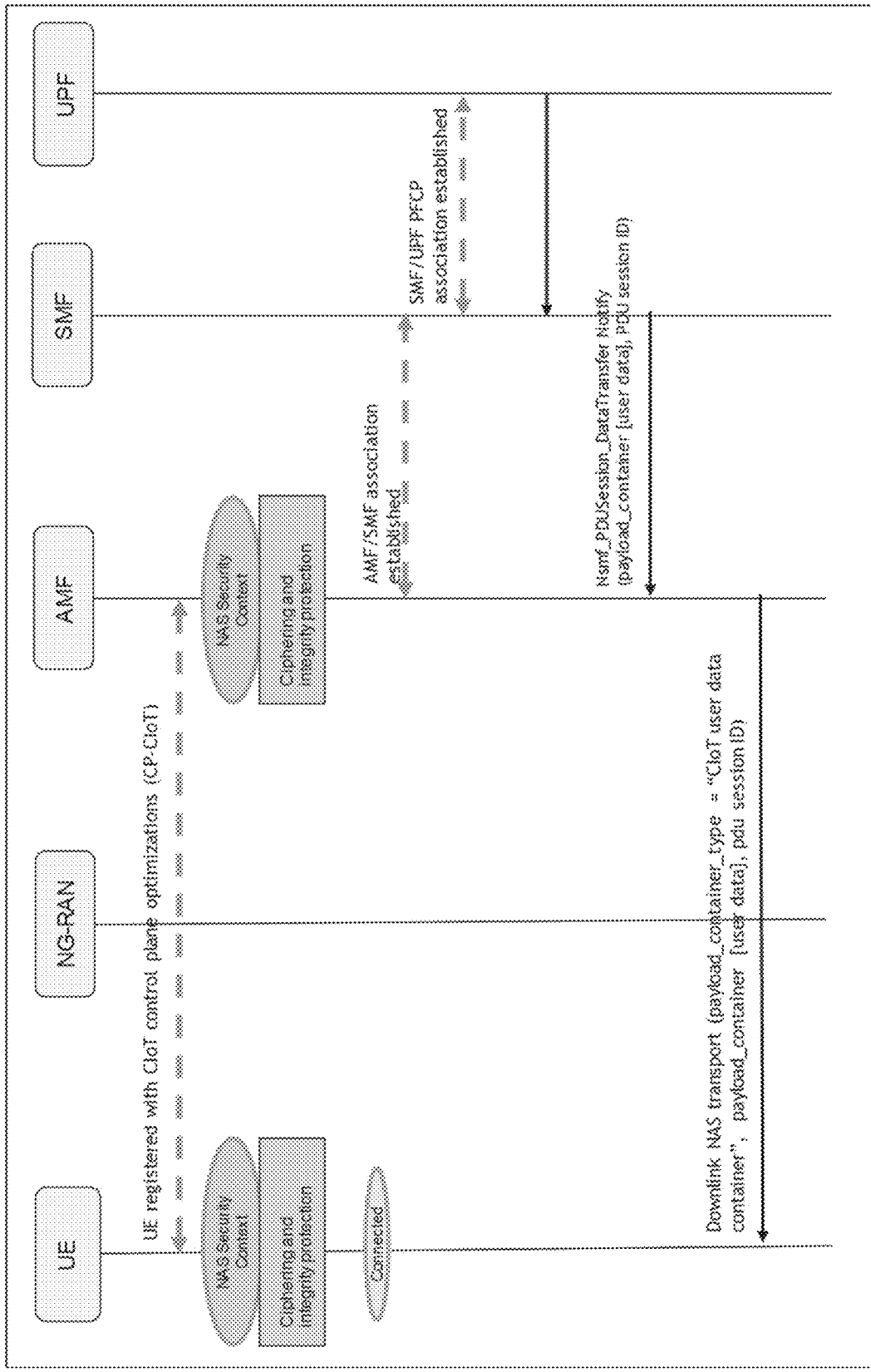
Figure 15:
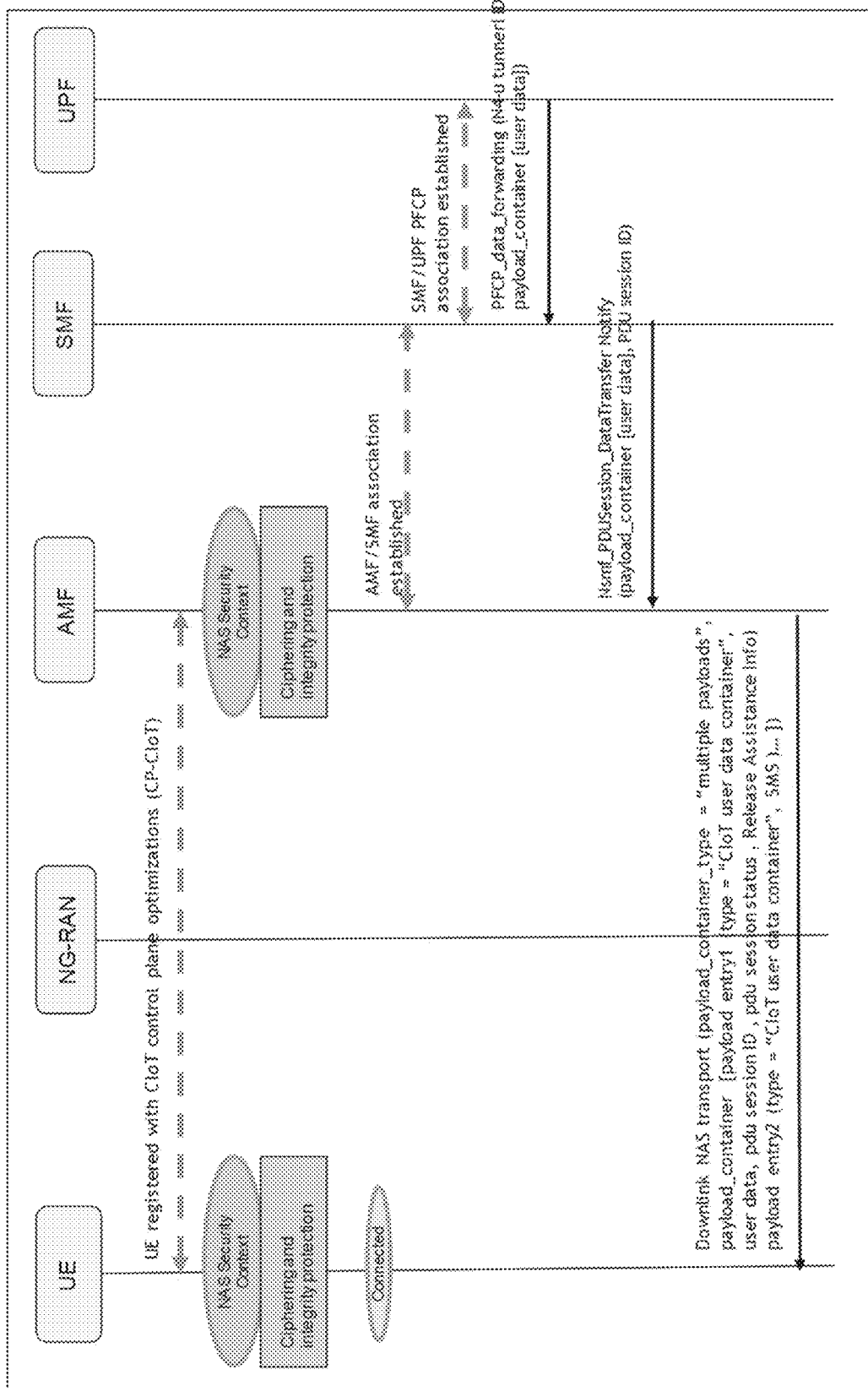
Figure 16:
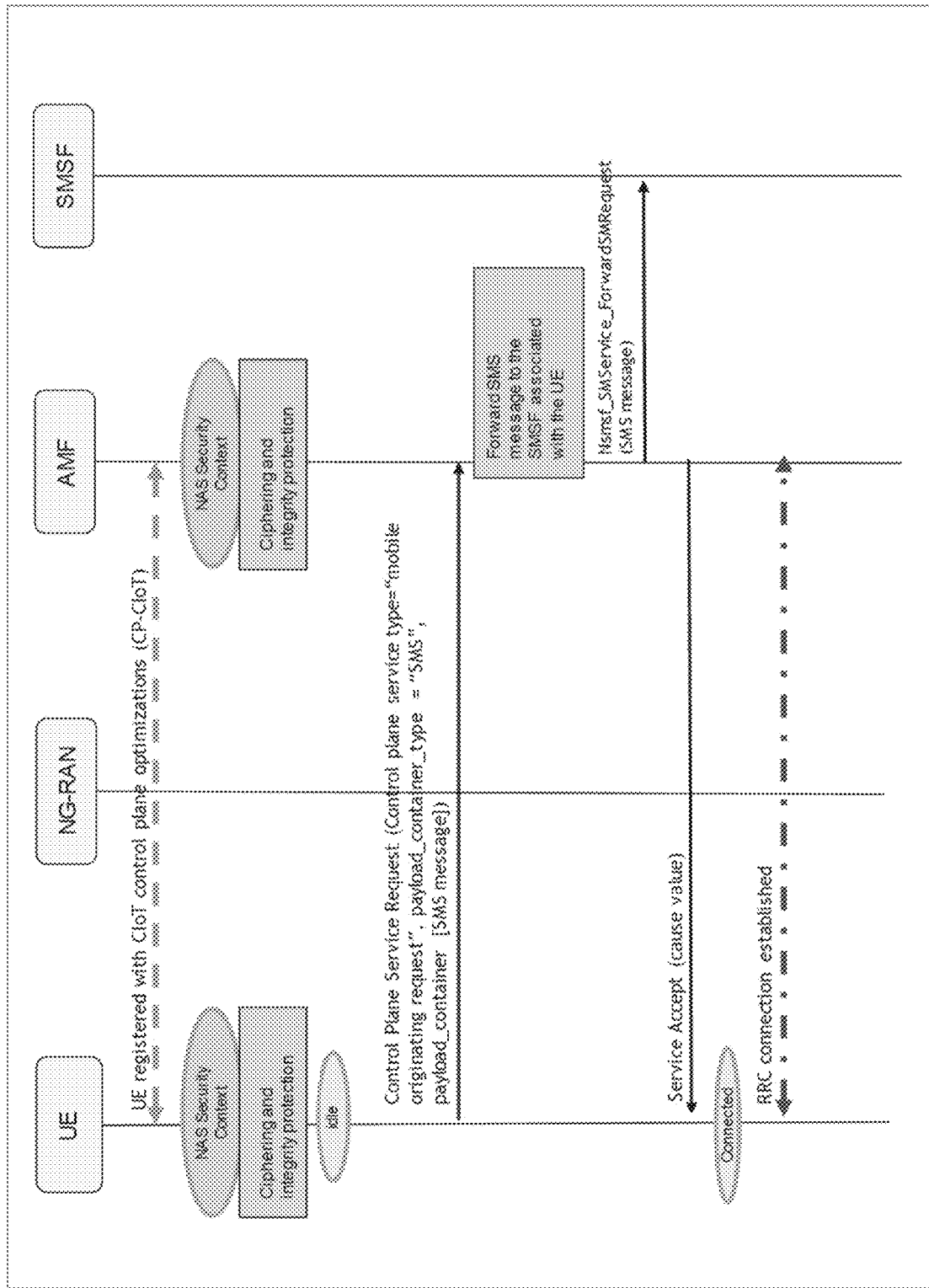
Figure 17:
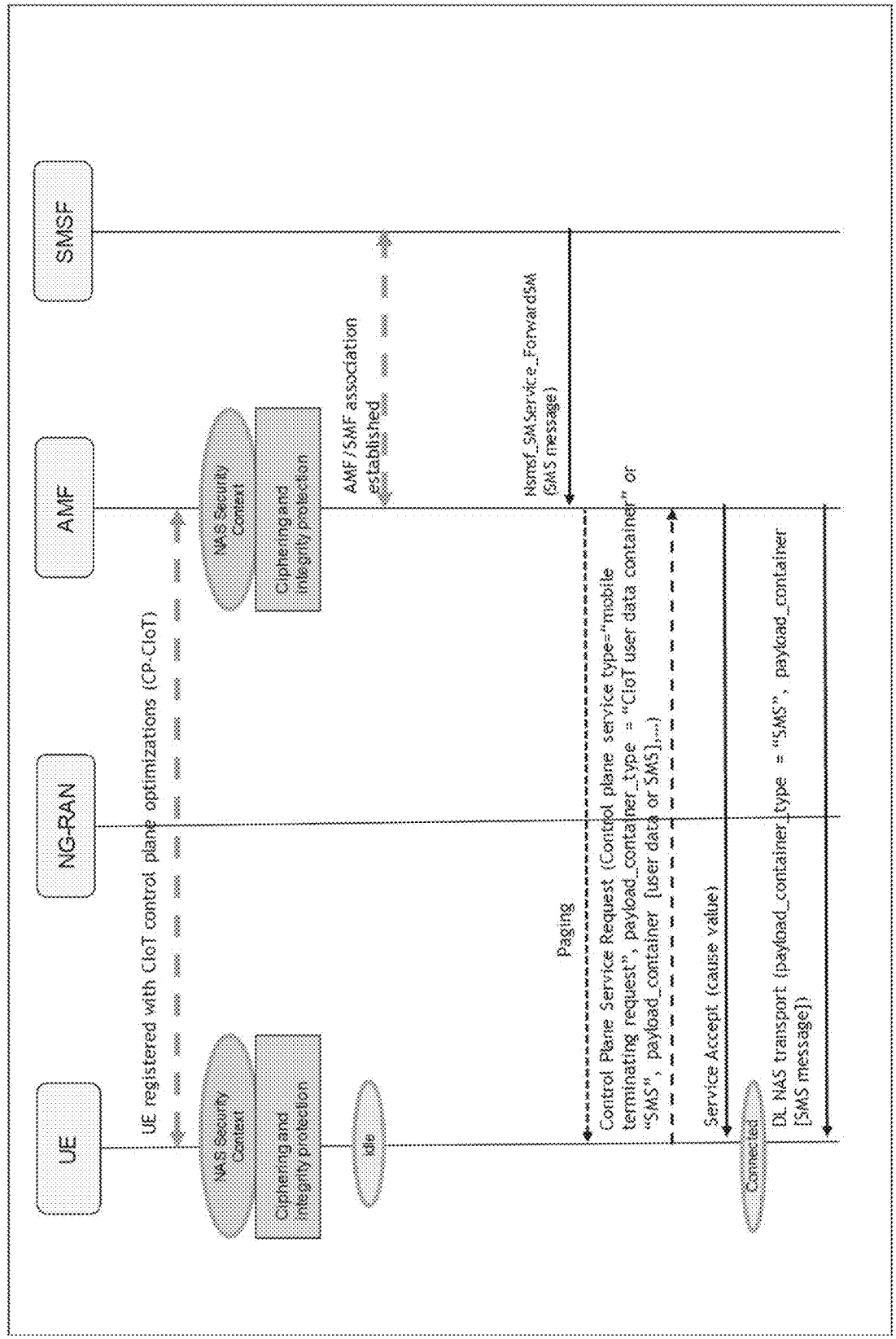
Figure 18:
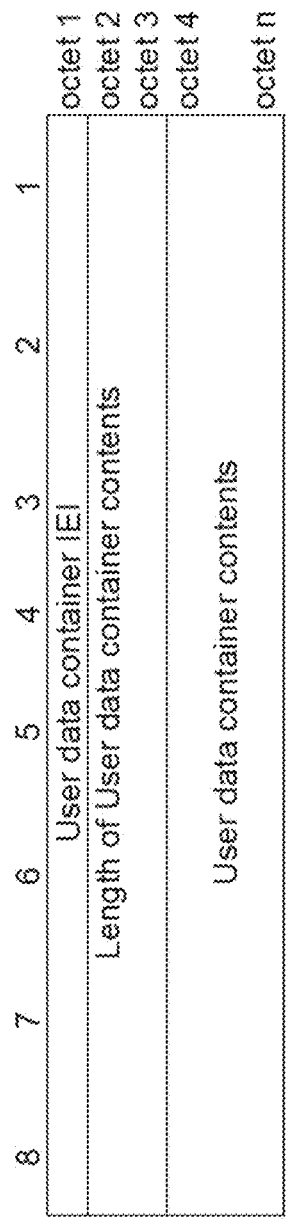
Figure 19:
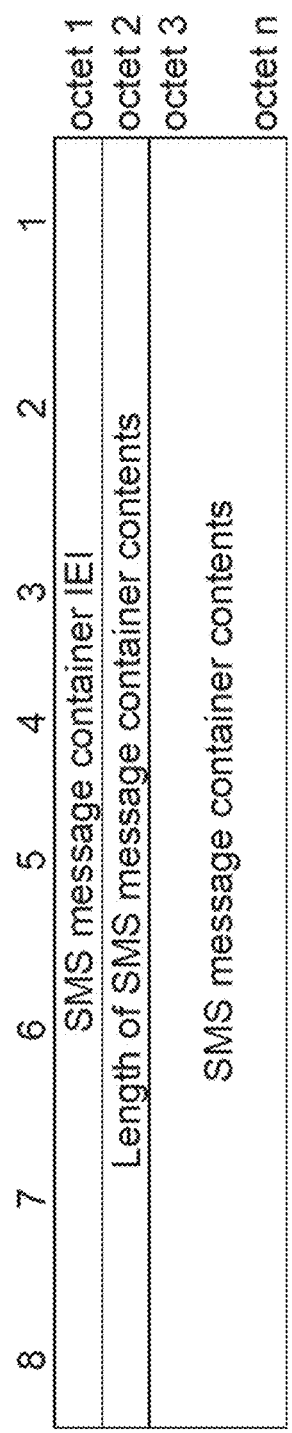
Figure 20:
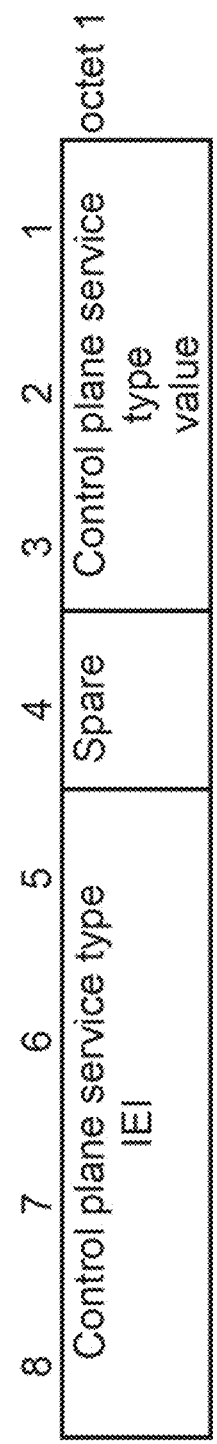

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating a set of operations performed, such as by the apparatus of FIG. 1, in accordance with an example embodiment of the present invention;

FIG. 3 is a graphical representation of messages sent between entities in a 5G network, in accordance with an example embodiment of the present invention;

FIG. 4 is a graphical representation of a process for uplink data transfer via control plane to a data network over an N6 interface in a 5G system, in accordance with an example embodiment of the present invention;

FIG. 5 is a graphical representation of a process for downlink data transfer via control plane to a data network over an N6 interface in a 5G system, in accordance with an example embodiment of the present invention;

FIG. 6 is an example procedure for encoding an information element for transport with one or more payloads, such as by the apparatus of FIG. 1, in accordance with an example embodiment of the present invention;

FIG. 7 is an example of a CIoT user data container configured to indicate a type of payload included in a payload container information element, in accordance with an example embodiment of the present invention;

FIG. 8 is a graphical representation of a process for uplink data transfer via control plane to a data network over N6 interface for user equipment in IDLE mode, in accordance with an example embodiment of the present invention;

FIG. 9 is a graphical representation of a process for uplink transfer of multiple user data and SMS messages via control plane for user equipment in IDLE mode, in accordance with an example embodiment of the present invention;

FIG. 10 is a graphical representation of a process for downlink data transfer via control plane for user equipment in IDLE mode, in accordance with an example embodiment of the present invention;

FIG. 11 is a graphical representation of a process for downlink transfer of multiple user data and SMS messages via control plane for user equipment in IDLE mode, in accordance with an example embodiment of the present invention;

FIG. 12 is a graphical representation of a process for uplink data transfer via control plane for user equipment in CONNECTED mode, in accordance with an example embodiment of the present invention;

FIG. 13 is a graphical representation of a process for uplink transfer of multiple user data and SMS messages via control plane for user equipment in CONNECTED mode, in accordance with an example embodiment of the present invention;

FIG. 14 is a graphical representation of a process for downlink data transfer via control plane for user equipment in CONNECTED mode, in accordance with an example embodiment of the present invention;

FIG. 15 is a graphical representation of a process for downlink transfer of multiple user data and SMS messages via control plane for user equipment in CONNECTED mode, in accordance with an example embodiment of the present invention;

FIG. 16 is a graphical representation of a process for uplink SMS messages transfer via control plane for user equipment in IDLE mode, in accordance with an example embodiment of the present invention;

FIG. 17 is a graphical representation of a process for downlink SMS messages transfer via control plane for user equipment in IDLE mode, in accordance with an example embodiment of the present invention;

FIG. 18 is a representation of a user data container information element, in accordance with an example embodiment of the present invention;

FIG. 19 is a representation of a NAS message container information element, in accordance with an example embodiment of the present invention; and FIG. 20 is a representation of a control plane service type information element, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Referring now to FIG. 1, an example of an apparatus and system for carrying out the methods, processes, and approaches described herein is provided. It will be appreciated that the apparatus 100 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for carrying out control plane CIoT data transfer in a wireless communication system, such as a 5G system, other configurations may also be used to implement certain embodiments of the present disclosure.

The apparatus 100 may be embodied as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In some example embodiments, the apparatus 100 is embodied as a mobile computing device, such as mobile telephones, mobile computers, personal digital assistants (PDAs), pagers, laptop computers, desktop computers, gaming devices, televisions, e-papers, and other types of electronic systems, which may employ various embodiments of the invention.

The apparatus 100 can include a computing device 102 including a processor 104, and storage, such as a non-volatile memory 106 and/or volatile memory 108. In some embodiments, the processor 104 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 104 comprises a plurality of processors. These signals sent and received by the processor 104 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, fifth-generation (5G), Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the apparatus 100 or a component thereof may be capable of operating according to Wi-Fi or Worldwide Interoperability for Microwave Access (WiMAX) protocols.

It is understood that the processor 104 may comprise circuitry for implementing audio/video and logic functions of the apparatus 100. For example, the processor 104 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC), an internal data modem (DM), and/or the like. Further, the processor may comprise functionality to operate one or more software programs, which may be stored in memory. For example, the processor 104 may be capable of operating a connectivity program, such as a web browser. The connectivity program may allow the apparatus 100 to transmit and receive web content, such as location-based content, according to a protocol, such as Wireless Application Protocol (WAP), hypertext transfer protocol (HTTP), and/or the like. The apparatus 100 may be capable of using a Transmission Control Protocol/Internet Protocol (TCP/IP) to transmit and receive web content across the internet or other networks.

The apparatus 100 may also comprise a user interface 112 including, for example, an earphone or speaker, a ringer, a microphone, a user display, a user input interface, and/or the like, which may be operationally coupled to the processor 104. In this regard, the processor 104 may comprise user interface circuitry configured to control at least some functions of one or more elements of the user interface, such as, for example, the speaker, the ringer, the microphone, the display, and/or the like. The processor 104 and/or user interface circuitry comprising the processor 104 may be configured to control one or more functions of one or more elements of the user interface through computer program instructions (e.g., software and/or firmware) stored on a memory accessible to the processor 104 (e.g., non-volatile memory 106, volatile memory 108, and/or the like). Although not shown, the apparatus 100 may comprise a battery for powering various circuits related to the apparatus 100, for example, a circuit to provide mechanical vibration as a detectable output. The apparatus 100 can further comprise a display 114. In some embodiments, the display 114 may be of any type appropriate for the electronic device in question with some examples including a plasma display panel (PDP), a liquid crystal display (LCD), a light-emitting diode (LED), an organic light-emitting diode display (OLED), a projector, a holographic display, or the like. The user interface 112 may comprise devices allowing the apparatus 100 to receive data, such as a keypad, a touch display (e.g., some example embodiments wherein the display 114 is configured as a touch display), a joystick (not shown), and/or other input device. In embodiments including a keypad, the keypad may comprise numeric (0-9) and related keys (#, *), and/or other keys for operating the apparatus 100.

The apparatus 100 may comprise memory, such as the non-volatile memory 106 and/or the volatile memory 108, such as RAM, read only memory (ROM), non-volatile RAM (NVRAM), a subscriber identity module (SIM), a removable user identity module (R-UIM), and/or the like. In addition to the memory, the apparatus 100 may comprise other removable and/or fixed memory. In some embodiments, the volatile memory 108 may include Random Access Memory (RAM) including dynamic and/or static RAM, on-chip or off-chip cache memory, and/or the like. In some embodiments, the non-volatile memory 106, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like the volatile memory 108, the non-volatile memory 106 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the apparatus 100.

Returning to FIG. 1, in an example embodiment, the apparatus 100 includes various means for performing the various functions herein described. These means may comprise one or more of the processor 104, the non-volatile memory 106, the volatile memory 108, the user interface 112, or the display 114. The means of the apparatus 100 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., storage 106 or 108) that is executable by a suitably configured processing device (e.g., the processor 104), or some combination thereof.

In some example embodiments, one or more of the means illustrated in FIG. 1 may be embodied as a chip or chip set. In other words, the apparatus 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 104, the memory 106 and/or 108, the user interface 112, and/or the display 114 may be embodied as a chip or chip set. The apparatus 100 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein.

The processor 104 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 1 as a single processor, in some embodiments the processor 104 comprises a plurality of processors. The plurality of processors may be in operative communication with each other and may be collectively configured to perform one or more functionalities of the apparatus 100 as described herein. The plurality of processors may be embodied on a single computing device or distributed across a plurality of computing devices collectively configured to function as the apparatus 100. In embodiments wherein the apparatus 100 is embodied as an apparatus 100, the processor 104 may be embodied as or comprise the processor 104 (shown in FIG. 1). In some example embodiments, the processor 104 is configured to execute instructions stored in the memory 106 and/or 108 or otherwise accessible to the processor 104. These instructions, when executed by the processor 104, may cause the apparatus 100 to perform one or more of the functionalities of the apparatus 100 as described herein. As such, whether configured by hardware or software methods, or by a combination thereof, the processor 104 may comprise an entity capable of performing operations according to embodiments of the present invention while configured accordingly. Thus, for example, when the processor 104 is embodied as an ASIC, FPGA or the like, the processor 104 may comprise specifically configured hardware for conducting one or more operations described herein. Alternatively, as another example, when the processor 104 is embodied as an executor of instructions, such as may be stored in the memory 106 and/or 108, the instructions may specifically configure the processor 104 to perform one or more algorithms and operations described herein.

The memory 106 and/or 108 may comprise, for example, volatile memory, non-volatile memory, or some combination thereof. In this regard, the memory 106 and/or 108 may comprise a non-transitory computer-readable storage medium. Although illustrated in FIG. 1 as a single memory, the memory 106 and/or 108 may comprise a plurality of memories. The plurality of memories may be embodied on a single computing device or may be distributed across a plurality of computing devices collectively configured to function as the apparatus 100. In various example embodiments, the memory 106 and/or 108 may comprise a hard disk, random access memory, cache memory, flash memory, a compact disc read only memory (CD-ROM), digital versatile disc read only memory (DVD-ROM), an optical disc, circuitry configured to store information, or some combination thereof. In some embodiments, the memory 106 and/or 108 may comprise the volatile memory 108 and/or the non-volatile memory 106 (shown in FIG. 1). The memory 106 and/or 108 may be configured to store information, data, applications, instructions, or the like for enabling the apparatus 100 to carry out various functions in accordance with various example embodiments. For example, in some example embodiments, the memory 106 and/or 108 is configured to buffer input data for processing by the processor 104. Additionally or alternatively, the memory 106 and/or 108 may be configured to store program instructions for execution by the processor 104. The memory 106 and/or 108 may store information in the form of static and/or dynamic information. The stored information may include, for example, images, content, media content, user data, application data, and/or the like. This stored information may be stored and/or used by the processor 104 during the course of performing its functionalities.

In some embodiments, the apparatus 100 can further comprise a communication interface (not shown) that may be embodied as any device or means embodied in circuitry, hardware, a computer program product comprising computer readable program instructions stored on a computer readable medium (e.g., the memory 106 and/or 108) and executed by a processing device (e.g., the processor 104), or a combination thereof that is configured to receive and/or transmit data from/to another computing device. In some example embodiments, the communication interface is at least partially embodied as or otherwise controlled by the processor 104. In this regard, the communication interface may be in communication with the processor 104, such as via a bus. The communication interface may include, for example, an antenna, a transmitter, a receiver, a transceiver and/or supporting hardware or software for enabling communications with one or more remote computing devices. In embodiments wherein the apparatus 100 is embodied as an apparatus 100, the communication interface may be embodied as or comprise the transmitter and the receiver. The communication interface may be configured to receive and/or transmit data using any protocol that may be used for communications between computing devices. In this regard, the communication interface may be configured to receive and/or transmit data using any protocol that may be used for transmission of data over a wireless network, wireline network, some combination thereof, or the like by which the apparatus 100 and one or more computing devices may be in communication. As an example, the communication interface may be configured to receive and/or otherwise access content (e.g., web page content, streaming media content, and/or the like) over a network from a server or other content source. The communication interface may additionally be in communication with the memory 106 and/or 108, user interface 112 and/or the processor 104, such as via a bus.

The user interface 112 may be in communication with the processor 104 and configured to receive an indication of a user input and/or to provide an audible, visual, mechanical, or other output to a user. As such, the user interface 112 may include, for example, a keyboard, a mouse, a joystick, a display, a touch screen display, a microphone, a speaker, and/or other input/output mechanisms. In embodiments wherein the apparatus 100 is embodied as an apparatus 100, the user interface 112 may be embodied as or comprise the user input interface, such as the display 114 (shown in FIG. 1), and other components such as a keypad, mouse, etc. The user interface 112 may be in communication with the memory 106 and/or 108, communication interface, a sensor, a speaker, and/or the processor 104, such as via a bus. In some example embodiments, the user interface 112 may comprise a single input/output mechanism. In other embodiments, the user interface 112 may comprise a content display and touch display, such as the display 114. In some embodiments, the user interface 112 may comprise a touch display user interface with a content display portion and a dedicated user input portion, such as a virtual keyboard, virtual piano, or an application with a designated key for user input.

The processor 104 may be embodied as various means, such as circuitry, hardware, a computer program product comprising computer readable program instructions stored on a computer readable medium (e.g., the memory 106 and/or 108) and executed by a processing device (e.g., the processor 104), or some combination thereof and, in some embodiments, is embodied as or otherwise controlled by the processor 104. The processor 104 may further be in communication with one or more of the memory 106 and/or 108, or user interface 112, such as via a bus.

The processor 104 may be configured to receive a user input from a user interface 112, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the processor 104 may determine an element/instruction/command that corresponds with a key, or image, displayed on the touch display user interface at the determined position or within a predefined proximity (e.g., within a predefined tolerance range) of the determined position. The processor 104 may be further configured to perform a function or action related to the key corresponding to the element/instruction/command determined by the processor 104 based on the position of the touch or other user input.

As described herein, NB-N1 mode indicates that the corresponding disclosure applies only to a system which operates in NB-N1 mode. For a multi-access system this case applies if the current serving radio access network provides access to 5G network services via E-UTRA by NB-IoT. In addition, WB-N1 mode indicates that the corresponding disclosure applies only to a system which operates in WB-N1 mode. For a multi-access system this case applies if the system operates in N1 mode, but not in NB-N1 mode.

FIGS. 2 and 3 illustrate an example process for the transfer of UE user data via control plane to a data network over an N6 interface in a 5G system. As used herein, "5G system," "5GS," "5GMM," "3GPP" and the like refer to a fifth-generation wireless communication protocol.

A system 200 for cellular Information of Things (CIoT) data transfer between user equipment 220 (UE 220) and a data network 227 is described. In some embodiments, the system 200 can introduce a new CONTROL PLANE SERVICE REQUEST for initial NAS messages. In some embodiments, data can be transmitted from user equipment 220 (UE 220) to an AMF 223 via a Next Generation Radio Access Network 222 (NG-RAN 222) with a 3GPP Access number 221. In some embodiments, upon receipt of the SERVICE REQUEST or CONTROL PLANE SERVICE REQUEST message from the US 220, the AMF 223 may initiate the common procedures, e.g., the 5G AKA based primary authentication and key agreement procedure or the EAP based primary authentication and key agreement procedure. A possible message path through the system 200 is illustrated as the dashed line identified as "UE user data transfer via control plane" in FIG. 2. The control plane route (dashed line) can follow a path from the AMF 223 to a Session Management Function 224 (SMF 224), from the SMF 224 to a User Plane Function 226 UPF 226, and from the UPF 226 to the data network 227. The system 200 can further include a n Authentication Server Function 210 (AUSF 210), a Unified Data Management 212 (UDM 212), and a Unified Data Repository 214 (UDR 214), which can comprise an Authentication Server 205 or the like. The system 200 can further include a Policy Control Function 225 (PCF 225). The system 200 or any component thereof can be embodied by the apparatus of FIG. 1 or any variant or component thereof. As such, the following description of processes and methods describes processes and methods that can likewise be carried out at least in part by the apparatus of FIG. 1 or any variant or component thereof.

The purpose of the service request procedure is to change the 5GMM mode from 5GMM-IDLE to 5GMM-CONNECTED mode. If the UE is not using EPS services with control plane CIoT EPS optimization, to request the establishment of user-plane resources for PDU sessions which are established without user-plane resources. In latter case, the 5GMM mode can be the 5GMM-IDLE mode or the 5GMM-CONNECTED mode if the UE requires to establish user-plane resources for PDU sessions. If the UE is using EPS services with control plane CIoT EPS optimization, this procedure can be used for UE initiated transfer of user data via the control plane.

Referring now to FIG. 4, the uplink transfer of UE user data via control plane to a data network over N6 interface in a 5G system is illustrated. In some embodiments, the process includes a UE registering with the AMF for CIoT control plane optimizations (CP-CIoT). The process can further include establishment of a NAS Security Context at both the UE and AMF and ciphering and integrity protection at both the UE and AMF. The process can further include the transmission from the UE to the AMF of a Control Plane Service Request (e.g., ngKSI, payload_container_type="CIoT user data container", payload_container [user data, pdu session ID]). The process can further include selection by the AMF of an SMF capable of small data transfer via NAS. The process can further include transmission of a Nsmf_PDUSession_DataTransfer Request (e.g., payload_container (user data), PDU session ID) from the AMF to the SMF. The process can further include selection by the SMF of a UPF or NEF for user data delivery based on configuration preferences or compatabilities. The process can further include subsequently or simultaneously with the "selection by the SMF of a UPF or NEF" stage, transmission by the AMF of a Service Accept message back to the UE. The process can further include transmission by the SMF of a PFCP_data_forwarding (N4-tunnel ID, payload_container [user data]) message to the UPF or NEF selected.

In some embodiments, a service request procedure can be initiated when the UE is not using 5GS services with control plane CIoT 5GS optimization. In some embodiments, the UE can send a CONTROL PLANE SERVICE REQUEST message, start T3517 and enter the state 5GMM-SERVICE-REQUEST-INITIATED.

For the following cases, the UE may invoke the service request procedure when:

a) the UE, in 5GMM-IDLE mode over 3GPP access, receives a paging request from the network;

b) the UE, in 5GMM-CONNECTED mode over 3GPP access, receives a notification from the network with access type indicating non-3GPP access;

c) the UE, in 5GMM-IDLE mode over 3GPP access, has uplink signalling pending;

d) the UE, in 5GMM-IDLE mode over 3GPP access, has uplink user data pending;

e) the UE, in 5GMM-CONNECTED mode or in 5GMM-CONNECTED mode with RRC inactive indication, has user data pending due to no user-plane resources established for PDU session(s) used for user data transport;

f) the UE in 5GMM-IDLE mode over non-3GPP access, receives an indication from the lower layers of non-3GPP access, that the access stratum connection is established between UE and network;

g) the UE, in 5GMM-IDLE mode over 3GPP access, receives a notification from the network with access type indicating 3GPP access when the UE is in 5GMM-CONNECTED mode over non-3GPP access;

h) the UE, in 5GMM-IDLE, 5GMM-CONNECTED mode over 3GPP access, or 5GMM-CONNECTED mode with RRC inactive indication, receives a request for emergency services fallback from the upper layer and performs emergency services fallback; or i) the UE, in 5GMM-CONNECTED mode over 3GPP access or in 5GMM-CONNECTED mode with RRC inactive indication, receives a fallback indication from the lower layers and or the UE has a pending NAS procedure other than a registration, service request, or de-registration procedure.

For case a, the Control plane service type of the CONTROL PLANE SERVICE REQUEST message shall indicate "mobile terminating request". The UE may include the ESM DATA TRANSPORT message. The UE shall not include any ESM message other than ESM DATA TRANSPORT message.

For case b, if the UE has pending IP or non-IP user data that is to be sent via the control plane radio bearers, the Control plane service type of the CONTROL PLANE SERVICE REQUEST message shall indicate "mobile originating request". The UE shall include an ESM DATA TRANSPORT message in the ESM message container IE. If the UE supports the CP-EDT, the UE shall provide the CONTROL PLANE SERVICE REQUEST message in the NAS request to the lower layer to establish a RRC connection.

For cases b and m, if the UE has pending IP or non-IP user data that is to be sent via the user plane radio bearers, the UE shall set the Control plane service type of the CONTROL PLANE SERVICE REQUEST message to "mobile originating request" and the "active" flag in the Control plane service type IE to 1. The UE shall not include any ESM message container or NAS message container IE in the CONTROL PLANE SERVICE REQUEST message.

For case c, the UE shall set the Control plane service type of the CONTROL PLANE SERVICE REQUEST message to "mobile originating request". If the CONTROL PLANE SERVICE REQUEST message is for sending SMS (short message service) messages or any other similar message format according to any suitable messaging protocol, the UE shall include the SMS message or the like in the NAS message container IE and shall not include any ESM message container IE in the CONTROL PLANE SERVICE REQUEST message. If the CONTROL PLANE SERVICE REQUEST message is for sending signaling different from SMS messages, the UE shall not include any ESM message container or NAS message container IE in the CONTROL PLANE SERVICE REQUEST message.

In some embodiments, the service request procedure may be accepted by the network when UE is using 5GS services with control plane CIoT 5GS optimization. Referring back to case a, upon receipt of the CONTROL PLANE SERVICE REQUEST message with Control plane service type indicating "mobile terminating request", after completion of the 5GMM common procedures, 1) if the AMF needs to initiate a PDU session status synchronization for a PDU session associated with Control Plane only indication or for a PDU session not associated with Control Plane only indication, there is no downlink user data pending to be delivered via the user plane, and the UE did not set the "active" flag in the Control Plane service type IE to 1; or 2) if the control plane data back-off time for the UE is stored in AMF and the AMF decides to deactivate congestion control for transport of user data via the control plane, then the AMF shall send a SERVICE ACCEPT message.

Furthermore, the AMF may 1) initiate the transport of user data via the control plane procedure or any other NAS signaling procedure; 2) if supported by the U and required by the network, initiate the setup of the user plan radio bearer(s); or 3) send a NAS signaling message not related to a 5GMM common procedure to the UE if downlink signaling is pending.

Referring back to case b, upon receipt of the CONTROL PLANE SERVICE REQUEST message with control plane service type indicating "mobile originating request," after completion of the 5GMM common procedures, if any, if the AMF needs to perform PDU session status synchronization for PDU session associated with control plane only indication or for PDU session not associated with Control plane only indication, there is no downlink user data pending to be delivered via the user plane, and the UE did not set the "active" flag in the Control plane service type IE to 1, then the AMF shall send a SERVICE ACCEPT message.

Furthermore, the AMF may 1) initiate release of the NAS signalling connection upon receipt of an indication from the ESM layer, unless the AMF has additional downlink user data or signalling pending; 2) initiate the setup of the user plane radio bearer(s), if downlink user data is pending to be delivered via the user plane or the UE has set the "active" flag in the Control plane service type IE to 1; 3) send an ESM DATA TRANSPORT message to the UE, if downlink user data is pending to be delivered via the control plane; 4) send a NAS signalling message not related to an 5GMM common procedure to the UE if downlink signalling is pending; or 5) send a SERVICE ACCEPT message to complete the service request procedure, if no NAS security mode control procedure was initiated, the AMF did not send a SERVICE ACCEPT message as specified above to perform PDU session status synchronization, and the AMF did not initiate any of the procedures specified in item 1 to 4 above. In some embodiments, the AMF can initiate the setup of the user plane radio bearer(s) if the AMF decides to activate the congestion control for transport of user data via the control plane.

Referring back to case m, upon receipt of the CONTROL PLANE SERVICE REQUEST message with Control plane service type indicating "mobile originating request" and the "active" flag in the Control plane service type IE set to 1, if the AMF accepts the request, the AMF shall initiate the setup of the user plane radio bearer(s) for all active EPS bearer contexts of PDU sessions that are established without control plane only indication; if the AMF does not accept the request, the AMF shall send a SERVICE ACCEPT message to complete the service request procedure. In some embodiments, the AMF can take into account the maximum number of user plane radio bearers supported by the UE, in addition to local policies and the UE's preferred CIoT network behaviour when deciding whether to accept the request to establish user plane bearer(s). If the AMF accepts the request, all PDU sessions are considered as established without Control plane only indication. In some embodiments, a UE in NB-N1 mode can support a maximum number of user plane radio bearers (e.g., a maximum number of 2).

Referring back to case c, upon receipt of the CONTROL PLANE SERVICE REQUEST message with Control plane service type indicating "mobile originating request" and without an ESM message container IE, after completion of the 5GMM common procedures, if any, the AMF proceeds as follows: if the AMF needs to perform a PDU session status synchronization for a PDU session associated with Control plane only indication; or for a PDU session not associated with Control plane only indication, and there is no downlink user data pending to be delivered via the user plane, then the AMF shall send a SERVICE ACCEPT message.

Furthermore, the AMF may 1) initiate the setup of the user plane radio bearer(s), if downlink user data is pending to be delivered via the user plane; 2) send an ESM DATA TRANSPORT message to the UE, if downlink user data is pending to be delivered via the control plane; 3) send a NAS signalling message not related to an 5GMM common procedure to the UE, if downlink signalling is pending; or 4) send a SERVICE ACCEPT message to complete the service request procedure, if no NAS security mode control procedure was initiated, the AMF did not send a SERVICE ACCEPT message as specified above to perform a PDU session status synchronization, and the AMF did not initiate any of the procedures specified in item 1 to 3 above.

In NB-N1 mode, for cases a, b, c and m, if the AMF needs to initiate the setup of user plane radio bearer(s), the AMF shall check if the UE can support the establishment of additional user plane radio bearer based on the multiple DRB support indicated by UE in the UE network capability IE.

For cases a, b and c, if the EPS bearer context status IE is included in the CONTROL PLANE SERVICE REQUEST message, the network shall deactivate all those EPS bearer contexts locally (without peer-to-peer signalling between the network and the UE) which are active on the network side but are indicated by the UE as being inactive. If a default EPS bearer context is marked as inactive in the EPS bearer context status IE included in the CONTROL PLANE SERVICE REQUEST message, and this default bearer is not associated with the last PDN connection of the UE in the AMF, the AMF shall locally deactivate all EPS bearer contexts associated to the PDN connection with the default EPS bearer context without peer-to-peer ESM signalling to the UE. If the default bearer is associated with the last remaining PDN connection of the UE in the AMF, and 5GMM-REGISTERED without PDN connection is supported by the UE and the AMF, the AMF shall locally deactivate all EPS bearer contexts associated to the PDN connection with the default EPS bearer context without peer-to-peer ESM signalling to the UE.

If the EPS bearer context status IE is included in the CONTROL PLANE SERVICE REQUEST and the AMF decides to respond with a SERVICE ACCEPT message, the AMF shall include a PDU session status IE, indicating which EPS bearer contexts are active in the AMF, except for the case when no EPS bearer context exists on the network side.

If the AMF needs to initiate PDU session status synchronization, the AMF may include a PDU session status IE in the SERVICE ACCEPT message also if no EPS bearer context status IE was included in the CONTROL PLANE SERVICE REQUEST message.

In an instance in which the AMF sends a SERVICE ACCEPT message upon receipt of the CONTROL PLANE SERVICE REQUEST message piggybacked with the ESM DATA TRANSPORT message, and if the Release assistance indication IE is set to "No further uplink or downlink data transmission subsequent to the uplink data transmission is expected" in the message, if the UE has indicated support for the control plane data back-off timer, or if the AMF decides to activate the congestion control for transport of user data via the control plane, then the AMF shall include the T3448 value IE in the SERVICE ACCEPT message.

If the AMF sends a SERVICE ACCEPT message and decides to deactivate congestion control for transport of user data via the control plane then the AMF shall delete the stored control plane data back-off time for the UE and the AMF shall not include timer T3448 value IE in SERVICE ACCEPT message.

For cases a, b, c, and m, if the EPS bearer context status IE is included in the CONTROL PLANE SERVICE REQUEST message or the AMF needs to initiate PDU session status synchronization, the AMF shall consider the service request procedure successfully completed when it sends the SERVICE ACCEPT message. If the EPS bearer context status IE is not included in the CONTROL PLANE SERVICE REQUEST message and the AMF does not need to initiate PDU session status synchronization, the AMF shall consider the service request procedure successfully completed in the following cases:
  when it successfully completes a NAS security mode control procedure;
  when it receives an indication from the lower layer that the user plane is setup, if radio bearer establishment is required;
  upon receipt of the CONTROL PLANE SERVICE REQUEST message and completion of the 5GMM common procedures, if any, if the CONTROL PLANE SERVICE REQUEST message was successfully integrity checked and the ESM message container or NAS message container in the CONTROL PLANE SERVICE REQUEST message, if applicable, was successfully deciphered, radio bearer establishment is not required, and the AMF has downlink user data or signalling not related to an 5GMM common procedure pending; and
  with the transmission of a SERVICE ACCEPT message or with the decision to initiate release of the NAS signalling connection, if the CONTROL PLANE SERVICE REQUEST message was successfully integrity checked and the ESM message container or NAS message container in the CONTROL PLANE SERVICE REQUEST message, if applicable, was successfully deciphered, radio bearer establishment is not required, and the AMF does not have any downlink user data or signalling pending.

If the AMF considers the service request procedure successfully completed the AMF shall: 1) forward the contents of the ESM message container IE, if any, to the ESM layer; and 2) forward the contents of the NAS message container IE, if any.

For cases a, b, and c, the UE shall treat the receipt of any of the following as successful completion of the procedure:
  a SECURITY MODE COMMAND message;
  a security protected 5GMM message different from a SERVICE REJECT message and not related to an 5GMM common procedure;
  a security protected ESM message; and
  receipt of the indication from the lower layers that the user plane radio bearers are set up.

Upon successful completion of the procedure, the UE shall reset the service request attempt counter, stop the timer T3417 and enter the state 5GMM-REGISTERED.

In some embodiments, the security protected 5GMM message can be e.g. a SERVICE ACCEPT message and the ESM message an ESM DATA TRANSPORT message.

For case m, the UE shall treat the indication from the lower layers that the user plane radio bearers are set up as successful completion of the procedure. The UE shall treat the receipt of a SERVICE ACCEPT message as completion of the procedure without the establishment of the user plane radio bearers. For both cases, the UE shall reset the service request attempt counter, stop the timer T3417 and enter the state 5GMM-REGISTERED.

For case b, the UE shall also treat the indication from the lower layers that the RRC connection has been released as successful completion of the procedure. The UE shall reset the service request attempt counter, stop the timer T3417 and enter the state 5GMM-REGISTERED.

For cases a, c, and m, the UE shall treat the indication from the lower layers that the RRC connection has been released as an abnormal case.

For cases a, b, and c, if the AMF needs to initiate PDU session status synchronization, the UE can receive a SERVICE ACCEPT message even after it received a SECURITY MODE COMMAND message or an indication from the lower layers that the user plane radio bearers are set up and determined successful completion of the service request procedure. Upon receipt of the SECURITY MODE COMMAND message or an indication from the lower layers that the user plane radio bearers are set up, the UE shall start timer T3449. If the UE receives a security protected ESM message or a security protected 5GMM message not related to a 5GMM common procedure, the UE shall stop the timer T3449. If the UE receives a SERVICE ACCEPT message while the timer T3449 is running, the UE shall treat the SERVICE ACCEPT message and stop the timer T3449. If the UE is not in state 5GMM-SERVICE-REQUEST-INITIATED and timer T3449 is not running, the receipt of the SERVICE ACCEPT message is considered as protocol error and the UE shall return 5GMM STATUS message; otherwise the UE shall treat the SERVICE ACCEPT message; and if the UE treats the SERVICE ACCEPT message and PDU session status IE is included in the message, the UE shall deactivate all those EPS bearers contexts locally (without peer-to-peer signalling between the UE and the AMF) which are active in the UE, but are indicated by the AMF as being inactive. If a default EPS bearer context is marked as inactive in the EPS bearer context status IE included in the SERVICE ACCEPT message, and this default bearer is not associated with the last remaining PDN connection in the UE, the UE shall locally deactivate all EPS bearer contexts associated to the PDN connection with the default EPS bearer context without peer-to-peer ESM signalling to the AMF. If the default bearer is associated with the last remaining PDN connection of the UE in the AMF, and 5GMM-REGISTERED without PDN connection is supported by the UE and the AMF, the UE shall locally deactivate all EPS bearer contexts associated to the PDN connection with the default EPS bearer context without peer-to-peer ESM signalling to the AMF.

If the T3448 value IE is present in the received SERVICE ACCEPT message, the UE shall stop timer T3448 if it is running, consider the transport of user data via the control plane as successful, and start timer T3448 with the value provided in the T3448 value IE.

If the UE is using EPS services with control plane CIoT EPS optimization, the T3448 value IE is present in the SERVICE ACCEPT message and the value indicates that this timer is either zero or deactivated, the UE shall consider this case as an abnormal case and proceed as if the T3448 value IE is not present.

If the UE in 5GMM-IDLE mode initiated the service request procedure by sending a CONTROL PLANE SERVICE REQUEST message and the SERVICE ACCEPT message does not include the T3448 value IE and if timer T3448 is running, then the UE shall stop timer T3448.

Referring now to FIG. 5, a network-initiated NAS transport process for downlink user data delivery via control plane over N6 interface in a 5G system is illustrated. In some embodiments, the network-initiated NAS transport procedure can be used to provide a transport of CIoT user data over control plane from the AMF to the UE in a 5GMM message. In some embodiments, the process includes a UE registering with the AMF for CIoT control plane optimizations (CP-CIoT). The process can further include establishment of a NAS Security Context at both the UE and AMF and ciphering and integrity protection at both the UE and AMF. The process can further include the establishment of an association (association) between the AMF and an SMF. The process can further include the association of the SMF with a UPF PFCP (UPF). The process can further include the transmission of a PFCP_data_forwarding (N3-u tunnerl ID, payload_container [user data]) message from the UPF to the SMF. The process can further include the transmission of an Nsmf_PDUSession_DataTransfer Notify (payload_container [user data], PDU session ID) message from the SMF to the AMF. The process can further include the transmission or transport or downlink NAS transport data (or the establishment of a downlink NAS transport pathway) (e.g., ngKSI, payload_container_type="CIoT user data container", payload_container [user data, PDU session ID]) from or between the AMF and the UE.

In some embodiments, in 5GMM-CONNECTION mode, the AMF initiates the NAS transport procedure by sending the DL NAS TRANSPORT message. In some embodiments, upon reception from an SMF of a 5GSM message indicating user data for a UE in the 5GMM-CONNECTION mode, the AMF can include the PDU session information (PDU session ID) in the PDU session ID IE, and set the Payload container type IE to "CIoT user data container", and set the Payload container IE to the 5GSM message. In some embodiments, upon reception of a DL NAS TRANSPORT message, the UE can or shall stop the timer T3346, if running. In some embodiments, if the Payload container type IE is set to "CIoT user data transfer" and if the Payload container IE successfully passes the integrity check and the 5GSM message in the Payload container IE and the PDU session ID is valid; the UE can or shall forward the CIoT user data to an upper layer (e.g., AMF, SMF, UPF, or the like).

In some embodiments, the SERVICE REQUEST message, such as a Control Plane Service Request Message, can be defined according to the message type, significance, direction, presence, format, length, and/or the like. In some embodiments, the SERVICE REQUEST message can be sent by the UE to the AMF in order to request transport of user data via the control plane. Therefore, in some embodiments, a message can have a type of CONTROL PLANE SERVICE REQUEST, a significance of DUAL, and a direction of UE to network. Table 1 identifies some example information elements for CONTROL PLANE SERVICE REQUEST message content.

TABLE 1

CONTROL PLANE SERVICE REQUEST message content

| IEI | Information Element | Type (Reference) | Presence | Format | Length |
|---|---|---|---|---|---|
|  | Extended protocol discriminator | Extended protocol discriminator (9.2) | M | V | 1 |
|  | Security header type | Security header type (9.3) | M | V | ½ |
|  | Spare half octet | Spare half octet (9.5) | M | V | ½ |
|  | Control plane service request message identity | Message type (9.7) | M | V | 1 |
|  | ngKSI | NAS key set identifier (9.11.3.32) | M | V | ½ |
| xx | Payload container type | Payload container type (9.11.3.40) | O | TV | ½ |
| yy | Payload container | Payload container (9.11.3.39) | O | TLV-E | 3-65537 |
| 50 | PDU session status | PDU session status (9.11.3.44) | O | TLV | 4-34 |
| 25 | Allowed PDU session status | Allowed PDU session status (9.11.3.13) | O | TLV | 4-34 |
| 71 | NAS message container | NAS message container (9.11.3.33) | O | TLV-E | 4-n |

In some embodiments payload container type can be included if the UE includes the Payload container IE. In some embodiments, the Payload container IE can be included if the UE has one or more data packets to be transferred. In some embodiments, the PDU Session Status IE can be included when the UE needs to indicate the PDU sessions that are associated with the access type that the message is sent over, that are active within the UE. In some embodiments, the Allowed PDU Session Status IE can be included if the SERVICE REQUEST message is sent in response to paging or notification via 3GPP access for PDU session(s) associated with non-3GPP access and the UE needs to indicate the user-plane resources of PDU session(s) associated with non -3GPP access allowed to be re-established over 3GPP access or if there is no PDU session(s) for which the UE allows the user-plane resources to be re-established over 3GPP access. In some embodiments the NAS Message Container IE can be included if the UE is sending a SERVICE REQUEST message as an initial NAS message and the UE needs to send non-cleartext IEs.

In some embodiments, the purpose of the Payload container information element is to transport one or multiple payloads. If multiple payloads are transported, the associated information of each payload are also transported together with the payload. In some embodiments, the Payload container information element is coded as shown in in FIG. 6. In some embodiments, the Payload container IE can be a type 6 information element with a minimum length of 4 octets and a maximum length of 65538 octets.

As such, in some embodiments, the Payload container contents (octed 4 to octet n) may have a max value of 65535 octets. In some embodiments, if the payload container type is set to "CIoT user data container" and is included in the CONTROL PLANE SERVICE REQUEST message, the payload container contents are coded the same way as the contents of the user data container IE for UE parameters update data type is set to value "0" except that the first three octets are not included. In some embodiments, the coding of Payload container contents is dependent on the particular application. In some embodiments, if the payload container type is set to "CIoT user data container" and is included in the DL NAS TRANSPORT message, the payload container contents can be coded the same way as the contents of the user data container IE except that the first three octets are not included.

In some embodiments, a new payload container type "CIoT user data container" can be used, as illustrated in FIG. 7. In some embodiments, the purpose of the Payload container type information element can be to indicate the type of payload included in the payload container information element. In some embodiments, for example, the Payload container type value (octet 1) can have bits of "4, 3, 2, 1 . . . 0, 0, 0, 1" where the "0, 0, 0, 1" refers to the CIoT user data container.

In some embodiments, when a DL NAS TRANSPORT message is used to transport CIoT user data from the AMF to the UE, the payload container type can be set to "CIoT user data container" and the user data can be included in Payload container IE, such as indicated in Table 2.

TABLE 2

DL NAS TRANSPORT message content

| IEI | Information Element | Type/Reference | Presence | Format | Length |
|---|---|---|---|---|---|
|  | . . . |  |  |  |  |
|  | DL NAS TRANSPORT message identity | Message type 9.7 | M | V | 1 |
|  | Payload container type | Payload container type 9.11.3.40 | M | V | ½ |
|  | Spare half octet | Spare half octet 9.5 | M | V | ½ |
|  | Payload container | Payload container 9.11.3.39 | M | LV-E | 3-65537 |
|  | . . . |  |  |  |  |

According to an alternative embodiments, a control plane service request procedure enables the UE to change from 5GMM-IDLE to 5GMM-CONNECTED mode. If the UE is using 5GS services with control plant CIoT 5GS Optimization, this procedure can be used for user equipment transfer of user data via the control plane. For instance, the control plane service request procedure can be used for transport uplink or downlink user data or SMS messages via the control plane for the UE in 5GMM-IDLE mode.

In some embodiments, the UE, when operating in IDLE mode over 3GPP access, can have user data uplink and SMS messages pending, can have downlink user data or SMS messages pending (may receive a paging request from the network), and/or can have uplink signaling pending. In some embodiments, user equipment operating in IDLE mode over 3GPP access can have uplink user data pending while the UE also uses 5GS services with control plane CIoT 5GS optimization.

Referring now to FIG. 8, a process for uplink transfer of single user data via control plane to a data network over N6 interface for user equipment in IDLE mode is illustrated. The process of FIG. 8 or any portion thereof can be carried out by any suitable computing device, such as the apparatus of FIG. 1, and in particular one or more processors in conjunction with computer program instructions stored on one or more memory devices. As illustrated, the process can include the registration of user equipment with an AMF for CIoT control plane optimizations. The UE and the AMF then both carry out a security setup via the NAS security context and carry out a ciphering and integrity protection procedure. The UE is then in IDLE mode. The UE, while remaining in IDLE mode, sends a control plane service request, such as a control plane service type "mobile originating request", payload_container_name, "CIoT user data container", payload_container [user data], PDU session ID, PDU session status, and/or Release Assistance Info, to the AMF. In some embodiments, the AMF can then forward the user data to the SMF associated with the UE, for instance as a Nsmf_PDUSession_DataTransfer Request (user data, PDU session ID). At or about the same time the AMF can send a Service Accept (PDU Session Status) message back to the UE. The UE can then switch in from IDLE mode to CONNECTED mode. At or about the same time, the SMF can then select a UPF or NEF for user data delivery based on configuration. A Radio Resource Control (RRC) connection can then be established between the UE and the AMF. The SMF can then send a PFCP_data_forwarding (N4-u tunner1 ID, payload_container [user data]) message or the like to the UPF or NEF selected. At or about the same time, the AMF can then release the RRC connection based on the Release Assistance information.

Referring now to FIG. 9, a process for uplink transfer of multiple user's user data and SMS messages via control plane for user equipment in IDLE mode is illustrated. The process of FIG. 9 or any portion thereof can be carried out by any suitable computing device, such as the apparatus of FIG. 1, and in particular one or more processors in conjunction with computer program instructions stored on one or more memory devices. As illustrated, the process can include the registration of user equipment with an AMF for CIoT control plane optimizations. The UE and the AMF then both carry out a security setup via the NAS security context and carry out a ciphering and integrity protection procedure. The UE is then in IDLE mode. The UE, while remaining in IDLE mode, sends a control plane service request, such as a control plane service type "mobile originating request", payload_container_type="multiple payloads", payload_container [payload entry1 (type="CIoT user data container", user data, PDU Session ID, PDU Session Status, Release Assistance Info, payload entry2 (type="CIoT user data container", SMS) . . . ]) and/or the like, to the AMF. The AMF can forward the user data to the SMF and the SMS Function (SMSF) associated with the UE. For instance, the AMF can send a Nsmf_PDUSession_DataTransfer request (user name, PDU session ID) to the SMF and a Nsmsf_SMService_ForwardSMRequest (SMS message) to the SMSF. The AMF can then send a Service Accept (PDU Session Status) message back to the UE. The UE can then switch from IDLE mode into CONNECTED mode. The SMF, at or about the same time, can then select a UPF or NEF for user data delivery based on configuration. An RRC connection can then be established between the UE and the AMF. The AMF can then release the RRC connection based on Release Assistance information.

In some embodiments, a process for uplink user data transfer via control plane for UE in IDLE mode can be carried out when a SMS message is sent or multiple uplink user data is to be sent. In some embodiments, if the UE has uplink user data to be sent, the UE sets the Control plane service type of the CONTROL PLANE SERVICE REQUEST message to "mobile originating request". In some embodiments, the UE shall set the Payload container type IE to "CIoT user data container" and set the Payload container IE to the user data container. In some embodiments, the UE can include with such a request the PDU session information (PDU session ID, PDU session status) associated with user data to be sent in the PDU session ID IE. In some embodiments, if the UE has additionally SMS messages to be sent or multiple uplink user data to be sent, the UE shall set the Payload container type IE to "multiple payload" and include SMS message and uplink user data in the payload container as individual payload entry to be included in the payload container IE. For each user data entry, the Payload container type IE of the payload entry is set to "CIoT user data container". For SMS message entry, the Payload container type IE of the payload entry is set to "SMS". In some embodiments, the UE can send a CONTROL PLANE SERVICE REQUEST message, start T3517 (a timer) and enter the state 5GMM-SERVICE-REQUEST-INITIATED. In some embodiments, upon receipt of the CONTROL PLANE SERVICE REQUEST message with Control plane service type indicating "mobile originating request", after completion of the 5GMM common procedures, the AMF shall send a SERVICE ACCEPT message to the UE. In some embodiments, if the Payload container IE is included in the CONTROL PLANE SERVICE REQUEST message, if the Payload container type IE is set to "CIoT user data container" and if the Payload container IE successfully passes the integrity check and the PDU session ID is valid, the AMF forwards the content of the Payload container IE to the SMF associated with the UE. In some embodiments, and if the Payload container IE is included in the CONTROL PLANE SERVICE REQUEST message, if the Payload container type IE is set to "SMS", the AMF forwards the content of the Payload container IE to the SMSF associated with the UE. In some embodiments, if the Payload container IE is included in the CONTROL PLANE SERVICE REQUEST message, and if the Payload container type IE is set to "multiple payload", the AMF extracts each payload entry and handle in a similar manner based on whether the entry type is "CIoT user data container" or "SMS". In some embodiments, if the PDU session status IE is included in the message or the AMF needs to perform a PDU session status synchronization, the AMF shall include a PDU session status IE in the SERVICE ACCEPT message to indicate which PDU sessions associated with the access type the SERVICE ACCEPT message is sent over are active in the AMF. In some embodiments, upon successful completion of the procedure, the UE shall reset the service request attempt counter, stop the timer T3517 and enter the state 5GMM-REGISTERED. In some embodiments, the UE shall also treat the indication from the lower layers that the RRC connection has been released as successful completion of the procedure. In some embodiments, if the PDU session status information element is included in the SERVICE ACCEPT message, then the UE shall perform a local release of all those PDU sessions which are active on the UE side associated with the 3GPP access but are indicated by the AMF as being inactive.

Referring now to FIG. 10, a process is illustrated for user equipment in IDLE mode over 3GPP access to have downlink user data pending while the UE is using 5GS services with control plane CIoT 5GS optimization. The process of FIG. 10 or any portion thereof can be carried out by any suitable computing device, such as the apparatus of FIG. 1, and in particular one or more processors in conjunction with computer program instructions stored on one or more memory devices. As illustrated, the process can include the downlink transfer of multiple user's user data or a combination of SMS message(s) and user data via control plane for user equipment in IDLE mode. As illustrated, the process can include the registration of user equipment with an AMF for CIoT control plane optimizations, for example via an NG-RAN. The UE and the AMF then both carry out a security setup via the NAS security context and carry out a ciphering and integrity protection procedure. The UE is then in IDLE mode. In some embodiments, the approach can subsequently include establishment of an AMF/SMF Association and subsequently include establishment of an SMF/UPF PFCP Association. A message is then transmitted from the UPF to the SMF and from the SMF to the AMF to transmit a Nsmf_PDUSession_DataTransfer Notify (user data, PDU session ID) message. The AMF then pages the UE regarding the downlink transfer and the UE transmits a Control Plane Service Request (control plane service type="mobile terminating request", payload_container_type="CIoT user data container", payload_container [user data], PDU session ID, and/or Release Assistance Info) to the AMF. The AMF then sends a Service Accept (PDU session status) message back to the UE and the UE subsequently switches from IDLE mode to CONNECTED mode. The AMF can then send a DL NAS transport (payload_container_type="CIoT user data container", payload_container [user data], PDU session ID) message to the UE.

Referring now to FIG. 11, a process for downlink transfer of multiple user's user data and SMS messages via control plane for user equipment in IDLE mode is illustrated. The process of FIG. 11 or any portion thereof can be carried out by any suitable computing device, such as the apparatus of FIG. 1, and in particular one or more processors in conjunction with computer program instructions stored on one or more memory devices. As illustrated, the process can include the downlink transfer of multiple user's user data or a combination of SMS message(s) and user data via control plane for user equipment in IDLE mode. As illustrated, the process can include the registration of user equipment with an AMF for CIoT control plane optimizations, for example via an NG-RAN. The UE and the AMF then both carry out a security setup via the NAS security context and carry out a ciphering and integrity protection procedure. The UE is then in IDLE mode. In some embodiments, the approach can subsequently include establishment of an AMF/SMF Association and subsequently include establishment of an SMF/UPF PFCP Association. The process can further include transmission of a PFCP_data_forwarding (N4-u tunnel1 ID, payload_container [user data]) message from the UPF to the SMF. The process can further include transmission of a Nsmf_PDUSession_DataTransfer Notify (user data, PDU Session ID) message from the SMF to the AMF. The AMF then pages the UE that the AMF is ready to receive service requests. The UE then sends a Control Plane Service Request (control plane service type="mobile terminating request", payload_container_type="multiple payloads", payload_container [payload entry1 (type="CIoT user data container", user data, PDU Session ID, PDU Session status, Release Assistance info_payload entry2 (type="CIoT user data container", SMS) . . . ]) to the AMF. The AMF then sends a Service Accept (PDU session status) message to the UE and the UE then switches from IDLE mode to CONNECTED mode. The AMF then transmits a DL NAS Transport (payload_container_type="CIoT user data container", payload_container [user data], PDU Session ID) message to the UE.

In some embodiments, a process for downlink user data transfer for multiple user's user data and SMS messages via control plane for user equipment in IDLE mode can be carried out. In some embodiments, the process can comprise an AMF receiving downlink user data from a SMF and initiate paging of the UE. In some embodiments, upon receiving paging from AMF, the UE can initiate a Control plane service request. In some embodiments, the Control plane service type of the CONTROL PLANE SERVICE REQUEST message indicates "mobile terminating request". Additionally, in some embodiments, if the UE has uplink user data to be sent, the UE shall set the Payload container type IE to "CIoT user data container" and set the Payload container IE to the user data container. In some embodiments, the UE can include the PDU session information (PDU session ID, PDU session status) associated with user data to be sent in the PDU session ID IE. In some embodiments, if the UE has uplink SMS messages to be sent, the UE shall set the Payload container type IE to "SMS" and include the SMS message in the Payload container IE. In some embodiments, if the UE has both uplink user data and SMS messages to be sent, the UE shall set the Payload container type IE to "multiple payload" and include SMS message and uplink user data in the payload container as individual payload entry according to any of the approaches described herein. In some embodiments, if the UE has multiple uplink user data or multiple SMS messages to be sent, each can be included as individual payload entry in the payload container IE. IN some embodiments, the process can comprise the UE sending the CONTROL PLANE SERVICE REQUEST message to the AMF, start T3517 (a timer) and enter the state 5GMM-SERVICE-REQUEST-INITIATED. In some embodiments, upon receipt of the CONTROL PLANE SERVICE REQUEST message with Control plane service type indicating "mobile originating request", after completion of the 5GMM common procedures, the AMF shall send a SERVICE ACCEPT message to the UE. In some embodiments, if the Payload container IE is included in the CONTROL PLANE SERVICE REQUEST message and if the Payload container type IE is set to "CIoT user data container", the AMF forwards the content of the Payload container IE to the SMF associated with the UE. In some embodiments, if the Payload container type IE is set to "SMS", the AMF forwards the content of the Payload container IE to the SMSF associated with the UE. In some embodiments, if the Payload container type IE is set to "multiple payload", the AMF extracts each payload entry and handle according to any of the approaches described herein based on whether the entry type is "CIoT user data container" or "SMS". In some embodiments, if the PDU session status IE is included in the message or the AMF needs to perform a PDU session status synchronization, the AMF shall include a PDU session status IE in the SERVICE ACCEPT message to indicate which PDU sessions associated with the access type the SERVICE ACCEPT message is sent over are active in the AMF. In some embodiments, the process can continue upon successful completion of the procedure, when the UE shall reset the service request attempt counter, stop the timer T3517 and enter the state 5GMM-REGISTERED. The UE shall also treat the indication from the lower layers that the RRC connection has been released as successful completion of the procedure. In some embodiments, if the PDU session status information element is included in the SERVICE ACCEPT message, then the UE shall perform a local release of all those PDU sessions which are active on the UE side associated with the 3GPP access but are indicated by the AMF as being inactive. In some embodiments, the AMF can include downlink user data using DL NAS TRANSPORT message by setting the Payload container type IE to "CIoT user data container" and set the Payload container IE to the user data container. In some embodiments, if there are also downlink SMS messages to be sent, the AMF sets the Payload container type IE to "multiple payload" and include a SMS message and downlink user data in the payload container as separate payload entry, with each entry formatted to include Payload container type to indicate the payload for each entry (same as when sent individually). In some embodiments, upon receipt of the DL NAS TRANSPORT message if the Payload container IE is included, if the Payload container type IE is set to "CIoT user data container" and if the Payload container IE successfully passes the integrity check and the PDU session ID is valid, the UE can forward the content of the Payload container IE to the upper layer. In some embodiments, upon receipt of the DL NAS TRANSPORT message if the Payload container IE is included, if the Payload container type IE is set to "SMS", the UE can forward the content of the Payload container IE to the SMS message stack entity. In some embodiments, upon receipt of the DL NAS TRANSPORT message if the Payload container IE is included, if the Payload container type IE is set to "multiple payload", the UE can extract each payload entry and handle according to any of the approaches described herein based on whether the entry type is "CIoT user data container" or "SMS".

Referring now to FIG. 12, CIoT user data can be delivered via control plane for user equipment in CONNECTED mode. FIG. 12 illustrates a process for uplink transfer of user equipment single user data via control plane to a data network over N6 interface for user equipment in CONNECTED mode. The process of FIG. 12 or any portion thereof can be carried out by any suitable computing device, such as the apparatus of FIG. 1, and in particular one or more processors in conjunction with computer program instructions stored on one or more memory devices. As illustrated, the process can include the registration of user equipment with an AMF for CIoT control plane optimizations, for example via an NG-RAN. The UE and the AMF then both carry out a security setup via the NAS security context and carry out a ciphering and integrity protection procedure. The UE is then in CONNECTED mode. In some embodiments, the approach can subsequently include the UE transmitting a UL_NAS_TRANSPORT (payload_container_type="CIoT user data container", payload_container [user data], PDU session ID, PDU session status, Release Assistance info) message to the AMF. The AMF can then forward user data to the SMF associated with the UE. The AMF can transmit a Nsmf_PDUSession_DataTransfer Request (user data, PDU session ID) message to the SMF. The SMF can then select a UPF or NEF for user data delivery based on configuration and transmit a PFCP_data_forwarding (N4-u tunner1 ID, payload_container [user data]) message to the UPF. The AMF can then release an RRC connection based on the Release Assistance information and transmit possible downlink data to the UE. An RRC connection can be released between the UE and the AMF and the UE can switch from CONNECTED mode to IDLE mode.

Referring now to FIG. 13, a process for uplink transfer of multiple user data or combination of SMS message(s) and user data via control plane for user equipment in CONNECTED mode is illustrated. The process of FIG. 13 or any portion thereof can be carried out by any suitable computing device, such as the apparatus of FIG. 1, and in particular one or more processors in conjunction with computer program instructions stored on one or more memory devices. As illustrated, the process can include the registration of user equipment with an AMF for CIoT control plane optimizations, for example via an NG-RAN. The UE and the AMF then both carry out a security setup via the NAS security context and carry out a ciphering and integrity protection procedure. The UE is then in CONNECTED mode. In some embodiments, the approach can subsequently include transmission of a UL_NAS_TRANSPORT (payload_container_type="multiple payloads", payload_container [payload entry1 (type="CIoT user data container", user data, PDU session ID, PDU session status, Release Asssitance info), payload entry2 (type="CIoT user data container", SMS) . . . ]) message from the UE to the AMF. The AMF can forward the user data to the SMF associated with the UE and transmit a Nsmf_PDUSession_DataTransfer Request (user data, PDU session ID) and send a Nsmsf_SMService_ForwardSMRequest (SMS message) to the SMSF. The SMF can then select a UPF or NEF for user data delivery based on configuration and sent a PFCP_data_forwarding (N4-u tunner1 ID, payload_container [user data]) message to the UPF or NEF. At or about the same time, the AMF can release the RRC connection based on the Release Assistance information and transit the possible downlink data to the UE. The RRC connection between the UE and the AMF can then be released. The UE can then switch from CONNECTED mode to IDLE mode.

In some embodiments, a process for uplink transfer of multiple user's user data via control plane for user equipment in CONNECTED mode can be carried out as follows. In particular, if the UE has uplink user data to be sent, the UE can set the Payload container type IE to "CIoT user data container" and set the Payload container IE to the user data container. The UE can include the PDU session information (PDU session ID, PDU session status) associated with user data to be sent in the PDU session ID IE. In some embodiments, if the UE additionally has a SMS message to be sent or multiple user's uplink user data to be sent, the UE shall set the Payload container type IE to "multiple payload" and include the SMS message(s) and uplink user data in the payload container as individual payload entry to be included in the payload container IE. For each user data entry, the Payload container type IE of the payload entry is set to "CIoT user data container". For SMS message entry, the Payload container type IE of the payload entry is set to "SMS". In some embodiments, the UE can include the Payload container type and the Payload container, formatted as above, in a UL NAS DATA TRANSPORT message, and sends the message to the AMF. In some embodiments, upon receipt of the UL NAS DATA TRANSPORT message, if the Payload container IE is included in the UL NAS DATA TRANSPORT message, if the Payload container type IE is set to "CIoT user data container" and if the Payload container IE successfully passes the integrity check and the PDU session ID is valid, the AMF forwards the content of the Payload container IE to the SMF associated with the UE.

In some embodiments, upon receipt of the UL NAS DATA TRANSPORT message, if the Payload container IE is included in the UL NAS DATA TRANSPORT message, if the Payload container type IE is set to "SMS", the AMF forwards the content of the Payload container IE to the SMSF associated with the UE. In some embodiments, upon receipt of the UL NAS DATA TRANSPORT message, if the Payload container IE is included in the UL NAS DATA TRANSPORT message, if the Payload container type IE is set to "multiple payload", the AMF extracts each payload entry and handle the same way as described above based on whether the entry type is "CIoT user data container" or "SMS".

Referring now to FIG. 14, a process is described for downlink user data delivery over control plane for user equipment in CONNECTED mode. For user equipment in CONNECTED mode, a network-initiated NAS transport procedure can be used to provide a transport of CIoT user data over control plane from the AMF to the UE in a 5GMM message. For instance, illustrated in FIG. 14 is a process for the downlink transfer of single user data via control plane to a data network over N6 interface in a 5G system. The process of FIG. 14 or any portion thereof can be carried out by any suitable computing device, such as the apparatus of FIG. 1, and in particular one or more processors in conjunction with computer program instructions stored on one or more memory devices. As illustrated, the process can include the registration of user equipment with an AMF for CIoT control plane optimizations, for example via an NG-RAN. The UE and the AMF then both carry out a security setup via the NAS security context and carry out a ciphering and integrity protection procedure. The UE is then in CONNECTED mode. In some embodiments, an AMF/SMF Association can be established between the AMF and the SMF chosen for the UE. In some embodiments a SMF/UPF PFCP Association can be established between the SMF and the UPF. In some embodiments, a message related to the downlink transfer can be transmitted from the UPF to the SMF and from the SMF to the AMF. In some embodiments, a message from at least the SMF to the AMF can comprise a Nsmf_PDUSession_DataTransfer Notify (payload_container [user data], PDU session ID) message. In some embodiments, the downlink NAS transport (payload_container_type="CIoT user data container", payload_container [user data], PDU session ID) can be transmitted between the AMF and the UE.

Referring now to FIG. 15, a process is illustrated for the downlink transfer of multiple user data or combination of SMS message(s) and user data via control plane for user equipment in CONNECTED mode. For user equipment in CONNECTED mode, a network-initiated NAS transport procedure can be used to provide a transport of CIoT user data over control plane from the AMF to the UE in a 5GMM message. The process of FIG. 15 or any portion thereof can be carried out by any suitable computing device, such as the apparatus of FIG. 1, and in particular one or more processors in conjunction with computer program instructions stored on one or more memory devices. As illustrated, the process can include the registration of user equipment with an AMF for CIoT control plane optimizations, for example via an NG-RAN. The UE and the AMF then both carry out a security setup via the NAS security context and carry out a ciphering and integrity protection procedure. The UE is then in CONNECTED mode. In some embodiments, an AMF/SMF Association can be established between the AMF and the SMF chosen for the UE. In some embodiments a SMF/UPF PFCP Association can be established between the SMF and the UPF. In some embodiments, the UPF can transmit a PFCP_data_forwarding (N4-u tunnel1 ID, payload_container [user data]) message to the SMF. The SMF can then transmit an Nsmf_PDUSession_DataTransfer Notify (payload_container [user data], PDU session ID) message to the AMF. The AMF can then transmit the downlink NAS transport (payload_container_type="multiple payloads", payload_container [payload entry1 type="CIoT user data container", user data, PDU session ID, PDU session status, Release Assistance info), payload entry2 (type="CIoT user data container", SMS) . . . ]) message to the UE.

A process for downlink user data transfer via control plane for user equipment in CONNECTED mode can be carried out in a 5GMM message system. For example, if the AMF has downlink user data to be sent, the AMF can set the Payload container type IE to "CIoT user data container" and set the Payload container IE to the user data container. The UE can include the PDU session information (PDU session ID, PDU session status) associated with user data to be sent in the PDU session ID IE. In some embodiments, if the AMF has additionally SMS messages to be sent or multiple downlink user data to be sent to the UE, the AMF shall set the Payload container type IE to "multiple payload" and include SMS messages and uplink user data in the payload container as individual payload entry in the payload container IE. For each user data entry, the Payload container type IE of the payload entry is set to "CIoT user data container". For SMS message entry, the Payload container type IE of the payload entry is set to "SMS". In some embodiments, the AMF can include Payload container type and Payload container formatted as above in a DL NAS DATA TRANSPORT message, and send the message to the UE. In some embodiments, upon receipt of the DL NAS TRANSPORT message, if the Payload container IE is included in the CONTROL PLANE SERVICE REQUEST message, and if the Payload container type IE is set to "CIoT user data container" and if the Payload container IE successfully passes the integrity check and the PDU session ID is valid, the UE forwards the content of the Payload container IE to the upper layer. In some embodiments, upon receipt of the DL NAS TRANSPORT message, if the Payload container IE is included in the CONTROL PLANE SERVICE REQUEST message, and if the Payload container type IE is set to "SMS", the UE forwards the content of the Payload container IE to the SMS message stack entity. In some embodiments, upon receipt of the DL NAS TRANSPORT message, if the Payload container IE is included in the CONTROL PLANE SERVICE REQUEST message, and if the Payload container type IE is set to "multiple payload", the UE extracts each payload entry and handles the same way as described above based on whether the entry type is "CIoT user data container" or "SMS".

Referring now to FIG. 16, a process for the uplink transfer of an SMS message via control plane for user devices in IDLE mode. The process of FIG. 16 or any portion thereof can be carried out by any suitable computing device, such as the apparatus of FIG. 1, and in particular one or more processors in conjunction with computer program instructions stored on one or more memory devices. As illustrated, the process can include the registration of user equipment with an AMF for CIoT control plane optimizations, for example via an NG-RAN. The UE and the AMF then both carry out a security setup via the NAS security context and carry out a ciphering and integrity protection procedure. The UE is then in IDLE mode. The UE can then transmit a Control Plane Service Request (control plane service type="mobile originating request", payload_container_type="SMS", payload_container [SMS message]) to the AMF. The AMF can then forward the SMS message to the SMSF associated with the UE, for example as a Nsmsf_SMService_ForwardSMRequest (SMS message) message. The AMF can then transmit a Service Accept (cause value) message back to the UE and the UE can switch from IDLE mode to CONNECTED mode. An RRC connection can then be established between the UE and the AMF.

In some embodiments, a procedure for uplink transfer of multiple SMS messages or a combination of SMS message and user data via control plane for user equipment in IDLE mode can be similar to that illustrated in FIG. 9, FIG. 16, some combination of the two, or a variation thereof.

In some embodiments, a procedure for uplink SMS message transport via control plane for user equipment in IDLE mode can be carried out if the UE has an uplink SMS message to be sent. For example, if if the UE has an uplink SMS messages to be sent, the UE can set the control plane service type of the CONTROL PLANE SERVICE REQUEST message to "mobile originating request". In some embodiments, the UE shall set the Payload container type IE to "SMS" and include the SMS message in the Payload container IE. In some embodiments, if the UE has additionally user data to be sent or multiple SMS message to be sent, the UE shall set the Payload container type IE to "multiple payloads" and include SMS message and uplink user data in the payload container as individual payload entry to be included in the payload container IE. For SMS message entry, the Payload container type IE of the payload entry can be set to "SMS". For each user data entry, the Payload container type IE of the payload entry can be set to "CIoT user data container". In some embodiments, the UE can then send a CONTROL PLANE SERVICE REQUEST message, start T3517 (a timer) and enter the state 5GMM-SERVICE-REQUEST-INITIATED. In some embodiments, upon receipt of the CONTROL PLANE SERVICE REQUEST message with Control plane service type indicating "mobile originating request", after completion of the 5GMM common procedures, the AMF can send a SERVICE ACCEPT message to the UE. In some embodiments, if the Payload container IE is included in the CONTROL PLANE SERVICE REQUEST message and if the Payload container type IE is set to "SMS", the AMF can forward the content of the Payload container IE to the SMSF associated with the UE. In some embodiments, the AMF can forward the content of the Payload container IE to the SMSF associated with the UE if the Payload container type IE is set to "CIoT user data container" and/or if the Payload container IE successfully passes the integrity check and the PDU session ID is valid. In some embodiments, the AMF can forward the content of the Payload container IE to the SMF associated with the UE. In some embodiments, the AMF can forward the content of the Payload container IE to the SMSF associated with the UE if the Payload container type IE is set to "multiple payload". In some embodiments, the AMF can then extract each payload entry and handle as above based on whether the entry type is "CIoT user data container" or "SMS".

Referring now to FIG. 17, an approach is described by which user equipment in IDLE mode over a 3GPP access can have downlink SMS messages pending while the UE is using 5GS services with control plane CIoT 5GS optimization, and for downlink transfer of SMS messages via control plane for user equipment in IDLE mode. The process of FIG. 17 or any portion thereof can be carried out by any suitable computing device, such as the apparatus of FIG. 1, and in particular one or more processors in conjunction with computer program instructions stored on one or more memory devices. As illustrated, the process can include the registration of user equipment with an AMF for CIoT control plane optimizations, for example via an NG-RAN. The UE and the AMF then both carry out a security setup via the NAS security context and carry out a ciphering and integrity protection procedure. The UE is then in IDLE mode. The AMF and SMSF can then establish an Association therebetween. The process can further include the SMSF transmitting the Nsmsf_SMService_ForwardSM (SMS message) message to the AMF, after which the AMF pages the UE. In some embodiments, the UE will then, in response to being paged, send the AMF a Control Plane Service Request (control plane service type="mobile terminating request", payload_container_type="CIoT user data container" or "SMS", payload_container [user data or SMS], . . . ). The AMF will then send the UE a Service Accept (cause value) transmission. The UE will then switch from IDLE mode to CONNECTED mode. The AMF can then send the UE a DL NAS Transport (payload_container_type="SMS", payload_container [SMS message]) message.

In some embodiments, a process for downlink transfer of multiple SMS messages or combinations of SMS messages and user data via control plane for user equipment in IDLE mode can include the AMF receiving downlink user data from the SMSF and initiating paging of the UE. In some embodiments, upon receiving paging from the AMF, the UE initiates a CONTROL PLANE SERVICE REQUEST. The control plane service type of the CONTROL PLANE SERVICE REQUEST message may indicate "mobile terminating request" to indicate that an SMS message is requested to be transferred. Additionally, if the UE has uplink user data to be sent, the UE can set the Payload container type IE to "CIoT user data container" and set the Payload container IE to the user data container. The UE can include the PDU session information (PDU session ID, PDU session status) associated with user data to be sent in the PDU session ID IE. In some embodiments, if the UE has uplink SMS messages to be sent, the UE can set the Payload container type IE to "SMS" and include the SMS message in the Payload container IE. In some embodiments, if the UE has both uplink user data and SMS messages to be sent, the UE shall set the Payload container type IE to "multiple payload" and include SMS messages and uplink user data in the payload container as individual payload entry as specified earlier in this section. In some embodiment, the process can further include sending, by and from the UE, a CONTROL PLANE SERVICE REQUEST message to the AMF, start T3517 (a timer) and enter the state 5GMM-SERVICE-REQUEST-INITIATED. In some embodiments, upon receipt of the CONTROL PLANE SERVICE REQUEST message with Control plane service type indicating "mobile terminating request", after completion of the 5GMM common procedures, the AMF shall send a SERVICE ACCEPT message to the UE. In some embodiments, if the Payload container IE is included in the CONTROL PLANE SERVICE REQUEST message, if the Payload container type IE is set to "CIoT user data container" and if the Payload container IE successfully passes the integrity check and the PDU session ID is valid, the AMF forwards the content of the Payload container IE to the SMF associated with the UE. In some embodiments, if the Payload container IE is included in the CONTROL PLANE SERVICE REQUEST message, if the Payload container type IE is set to "CIoT user data container" and if the Payload container type IE is set to "SMS", the AMF forwards the content of the Payload container IE to the SMSF associated with the UE. In some embodiments, if the Payload container IE is included in the CONTROL PLANE SERVICE REQUEST message, if the Payload container type IE is set to "CIoT user data container" and if the Payload container type IE is set to "multiple payload", the AMF extracts each payload entry and handles in the same way as described earlier in this section based on whether the entry type is "CIoT user data container" or "SMS". In some embodiments, the AMF can include a downlink SMS message using a DL NAS TRANSPORT message by setting the Payload container type IE to "SMS" and including the SMS message in the Payload container IE. If there are also downlink user data to be sent, the AMF can set the Payload container type IE to "multiple payload" and include SMS message and downlink user data in the payload container as separate payload entry, with each entry formatted to include Payload container type to indicate the payload for each entry (same as when sent individually). In some embodiments, upon receipt of the DL NAS TRANSPORT message, if the Payload container IE is included and if the Payload container type IE is set to "SMS", the UE forwards the content of the Payload container IE to the SMS message stack entity. In some embodiments, upon receipt of the DL NAS TRANSPORT message, if the Payload container IE is included and if the Payload container type IE is set to "CIoT user data container" and if the Payload container IE successfully passes the integrity check and the PDU session ID is valid, the UE forwards the content of the Payload container IE to an upper layer (e.g., AMF, SMSF, or the like). In some embodiments, upon receipt of the DL NAS TRANSPORT message, if the Payload container IE is included and if the Payload container type IE is set to "multiple payload", the UE extracts each payload entry and handles in a similar manner as descried elsewhere in this portion based on whether the entry type is "CIoT user data container" or "SMS".

Message Control

In some embodiments, the CONTROL PLANE SERVICE REQUEST message is sent by the UE to the AMF in order to request transport of user data via the control plane. The CONTROL PLANE SERVICE REQUEST message can contain varied content indicative of the type, payload, status, and other characteristics of the message, connection, or otherwise. A selection of possible contents for a CONTROL PLANE SERVICE REQUEST are provided below in Table 3.

TABLE 3

CONTROL PLANE SERVICE REQUEST message content

| IEI | Information Element | Type/Reference | Presence | Format | Length |
|---|---|---|---|---|---|
| ... | | | | | |
| | Control plane service request message identity | Message type 9.7 | M | V | 1 |
| Xx | Payload container type | Payload container type 9.11.3.40 | O | TV | ½ |
| Yy | Payload container | Payload container 9.11.3.39 | O | TLV-E | 3-65537 |
| 12 | PDU session ID | PDU session identity 2 9.11.3.41 | C | TV | 2 |
| 50 | PDU session status | PDU session status 9.11.3.44 | O | TLV | 4-34 |
| F- | Release assistance indication | Release assistance indication 9.11.3.y | O | TV | 1 |

TABLE 3-continued

CONTROL PLANE SERVICE REQUEST message content

| IEI | Information Element | Type/Reference | Presence | Format | Length |
|---|---|---|---|---|---|
| 71 | NAS message container | NAS message container 9.11.3.33 | O | TLV-E | 4-n |

In some embodiments, the payload container type IE can be included in such messages if the UE includes the payload container IE. In some embodiments, the payload container IE can be included in such messages if the UE has one or multiple data packets to be transferred. In some embodiments, the PDU session ID IE can be included in such messages when the payload container type IE is set to "CIoT user data container". In some embodiments, the PSU session status IE can be included when the UE needs to indicate the PDU sessions that are associated with the access type that the message is sent over, that are active with in the UE. In some embodiments, the Release Assistance indication IE can be included in such messages by the UE to inform the network whether further uplink or downlink data transmission is expected. In some embodiments, the NAS message container IE can be included if the UE is sending a CONTROL PLANE SERVICE REQUEST message as an initial NAS message and the UE needs to send non-cleartext IEs.

The UL NAS TRANSPORT message can transport message payload and associated information from the UE to the AMF. The UL NAS TRANSPORT message can contain varied content indicative of the message identify, container type, payload, connection/disconnection protocols, and the like. A selection of possible contents for a UL NAS TRANSPORT message are provided below in Table 4.

TABLE 4

UL NAS TRANSPORT message content

| IEI | Information Element | Type/Reference | Presence | Format | Length |
|---|---|---|---|---|---|
| ... | | | | | |
| | UL NAS TRANSPORT message identity | Message type 9.7 | M | V | 1 |
| | Payload container type | Payload container type 9.11.3.40 | M | V | ½ |
| | Payload container | Payload container 9.11.3.39 | M | LV-E | 3-65537 |
| 12 | PDU session ID | PDU session identity 2 9.11.3.41 | C | TV | 2 |
| F- | Release assistance indication | Release assistance indication 9.11.3.y | O | TV | 1 |
| ... | | | | | |

In some embodiments, the PDU session ID IE can be included in a UL NAS TRANSPORT message by the UE when the payload container type IE is set to "CIoT user data container". In some embodiments, the Release Assistance indication IE can be included by the UE to inform the network whether further uplink or downlink data transmission is expected.

In some embodiments, the DL NAS TRANSPORT message can be sent from the network to transport message payload and associated information to the UE. An example of selected content from such a DL NAS TRANSPORT message is provided below in Table 5.

TABLE 5

UL NAS TRANSPORT message content

| IEI | Information Element | Type/Reference | Presence | Format | Length |
|---|---|---|---|---|---|
| | . . . | | | | |
| | DL NAS TRANSPORT message identity | Message type 9.7 | M | V | 1 |
| | Payload container type | Payload container type 9.11.3.40 | M | V | ½ |
| | Payload container | Payload container 9.11.3.39 | M | LV-E | 3-65537 |
| 12 | PDU session ID | PDU session identity 2 9.11.3.41 | C | TV | 2 |
| | . . . | | | | |

In some embodiments, the AMF can include the PDU session ID IE in such UL NAS TRANSPORT messages sent from the network to the UE when the payload container type IE is set to "CIoT user data container".

In some embodiments, the "CIoT user data container" is a payload container type IE that indicates the type of payload included in the payload container IE. The payload container type value (octet 1) can include 2 bits for an SMS message, 1 bit for a CIoT user data container and 4+3+2+1 bits for multiple payloads.

The user data container IE can be used to encapsulate the user data transferred between the UE and the network. As such, the user data container IEI can be characterized, in some embodiments, as shown in FIG. 18 in which octet 1 designates the user data container IEI as such, octet 2 and 3 designate the length of user data container contents, and octets 4-n contain or comprise the user data container contents (user data).

In some embodiments, the SMS message container IE can be used to encapsulate the SMS messages transferred between the UE and the network with a maximum length of 253 octets (maximum of 2,024 bits). As such, the SMS message container IE can be characterized, in some embodiments, as shown in FIG. 19 in which octet 1 designates the SMS message container IEI as such, octet 2 designates the length of the SMS message container contents, and octets 3-n (where n is between 4 and 253) designate or contain the SMS message container contents (SMS message). The SMS message IE can contain an SMS message of any suitable type or protocol, such as but not limited to CP-DATA, CP-ACK, CP-ERROR, among others.

In some embodiments, the Control plane service type IE can be added to specify the purpose of the CONTROL PLANE SERVICE REQUEST message. In some embodiments, the control plane service type IE can be characterized as shown in FIG. 20. As such, in some embodiments, the control plane service type IEI can be organized as one or more octets where octet 1 comprises the control plane service type value (bits 1-3), a spare (bit 4), and the control plane service type IEI (bits 5-8). As such, bits 1-3 can be used to indicate a mobile originating request, a mobile terminating request, or otherwise.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method of control plane messaging between a first entity and a second entity in a network in which control plane messages are sent in a control plane protocol, the method comprising:
   sending from a user equipment (UE) to a core access and mobility management function (AMF), a control plane service request message;
   starting a T3517 timer and entering a service request initiated state;
   changing a mode of the UE from an idle mode to a connected mode; and
   initiating transfer of user data, to the AMF, via a control plane, wherein said user data comprises cellular internet-of-things (CIoT) user data in a CIoT user data container, stored within a payload.

2. The method of claim 1, further comprising:
   including one or more protocol data unit (PDU) session identifications and one or more release assistance indications in the payload;
   indicating a payload container type in a payload container type information element (IE) of the payload, wherein the payload container type is a CIoT user data container type;
   indicating the payload container type to a user data container of the payload; and
   sending an uplink non-access stratum transport message to the AMF.

3. The method of claim 1, wherein the control plane service request message is sent from the UE to the AMF in response to either:
   the UE being in the connected mode over 3GPP access and the UE receiving a paging request from the AMF,
   the UE being in the connected mode over 3GPP access and receiving a notification from the AMF with an access type indicating non-3GPP access,
   the UE being in the idle mode over 3GPP access and having uplink signalling pending,
   the UE being in the idle mode over 3GPP access and having uplink user data pending,
   the UE being in the connected mode, or in the connected mode with a radio resource control (RRC) inactive indication, and having user data pending due to no user-plane resources being established for one or more protocol data unit (PDU) sessions used for user data transport,
   the UE being in the idle mode over non-3GPP access and receiving an indication from lower layers of the non-3GPP access, wherein an access stratum connection is established between the UE and the AMF,
   the UE being in the idle mode over 3GPP access and receiving a notification from the AMF with access type indicating 3GPP access when the UE is in the connected mode over non-3GPP access, or the UE being in the idle mode, in the connected mode over 3GPP access, or in the connected mode with the RRC inactive indication, and in response to receiving a request for emergency services fallback from one or more upper layers of the 3GPP access.

4. The method of claim 3, wherein the control plane service request message is sent from the UE to the AMF in response to the UE being in the idle mode, in the connected mode over 3GPP access, or in the connected mode with the RRC inactive indication, and in response to receiving the request for emergency services fallback from the one or more upper layers of the 3GPP access, wherein the method further comprises:
performing emergency services fallback.

5. The method of claim 1, wherein the control plane service request message is sent from the UE to the AMF in response to the UE being in the connected mode over 3GPP access or in the connected mode with a radio resource control (RRC) inactive indication, and in response to the UE receiving a fallback indication from one or more lower layers of the 3GPP access, or when the UE has a pending NAS procedure other than a registration procedure, a service request procedure, or a de-registration procedure.

6. A method of control plane messaging between entities in a network in which control plane messages are sent according to a control plane protocol, the method comprising:
receiving, from a user equipment (UE) or a session management function (SMF), at a core access and mobility management function (AMF), a control plane service request message; in an instance in which the AMF determines, based upon the control plane service request message, that the UE satisfies one or more conditions, sending, by the AMF, to the UE or the SMF, a service accept message; and
receiving, at the AMF, from the UE or the SMF, user data via a control plane, wherein said user data comprises cellular internet-of-things (CIoT) user data in a CIoT user data container, stored within a payload.

7. The method of claim 6, further comprising:
initiating, based upon the control plane service request message and the user data, an authentication and key agreement procedure or an extensible authentication protocol.

8. The method of claim 6, wherein the payload further comprises one or more protocol data unit (PDU) session identifications and one or more release assistance indications in the payload, wherein a payload container type is indicated in a payload container type information element (IE) of the payload as being a CIoT user data container type, and wherein the payload container type is indicated to a user data container of the payload, the method further comprising:
receiving, from the UE, an uplink non-access stratum transport message.

9. The method of claim 8, further comprising:
identifying a PDU session routing context for the UE and the PDU session identification; and
forwarding the PDU session routing context of a payload container IE towards a session management function (SMF) identified by the PDU session routing context.

10. The method of claim 9, further comprising:
in an instance in which a release assistance indication IE is included in the uplink non-access stratum transport message received from the UE, a downlink data expected (DDX) field of the release assistance indication IE indicates that no further uplink and no further downlink data transmission subsequent to the uplink data transmission is expected, and there is no downlink signalling or downlink data for the UE, initiating release of a connection and mobility management (N1) interface on a non-access stratum signaling connection.

11. An apparatus comprising at least one processor and at least one memory storing computer program code, the at least one memory and the computer program code configured to, with the at least one processor, cause the apparatus to:
send, to a core access and mobility management function (AMF), a control plane service request message;
start a T3517 timer and enter a service request initiated state;
change a mode of the apparatus from an idle mode to a connected mode; and
initiate transfer of user data, to the AMF, via a control plane, wherein said user data comprises cellular internet-of-things (CIoT) user data in a CIoT user data container, stored within a payload.

12. The apparatus of claim 11, wherein the at least one memory and the computer program code are further configured to, with the at least one processor, cause the apparatus to:
include one or more protocol data unit (PDU) session identifications and one or more release assistance indications in the payload;
indicate a payload container type in a payload container type information element (IE) of the payload, wherein the payload container type is a CIoT user data container type;
indicate the payload container type to a user data container of the payload; and
send an uplink non-access stratum transport message to the AMF.

13. An apparatus comprising at least one processor and at least one memory storing computer program code, the at least one memory and the computer program code configured to, with the at least one processor, cause the apparatus to:
receive, from a user equipment (UE) or a session management function (SMF), at the apparatus, a control plane service request message;
in an instance in which the apparatus determines, based upon the control plane service request message, that the UE satisfies one or more conditions, send, to the UE or the SMF, a service accept message; and
receive, at the AMF, from the UE or the SMF, user data via a control plane, wherein said user data comprises cellular internet-of-things (CIoT) user data in a CIoT user data container, stored within a payload.

14. The apparatus of claim 13, wherein the at least one memory and the computer program code are further configured to, with the at least one processor, cause the apparatus to:
initiate, based upon the control plane service request message and the user data, an authentication and key agreement procedure or an extensible authentication protocol.

15. A computer program product comprising a non-transitory computer-readable storage medium having stored thereon computer-readable code, which, when executed by at least one processor, causes the at least one processor to:
send, from a user equipment (UE), to a core access and mobility management function, a control plane service request message;
start a T3517 timer and enter a service request initiated state;

change a mode of the UE from an idle mode to a connected mode; and initiate transfer of user data, to the AMF, via a control plane, wherein said user data comprises cellular internet-of-things (CIoT) user data in a CIoT user data container, stored within a payload.

16. A computer program product comprising a non-transitory computer-readable storage medium having stored thereon computer-readable code, which, when executed by at least one processor, causes the at least one processor to:

receive, from a user equipment (UE) or a session management function (SMF), at a core access and mobility management function (AMF), a control plane service request message;

in an instance in which the AMF determines, based upon the control plane service request message, that the UE satisfies one or more conditions, cause the AMF to send, to the UE or the SMF, a service accept message; and receive, at the AMF, from the UE or the SMF, user data via a control plane, wherein said user data comprises cellular internet-of-things (CIoT) user data in a CIoT user data container, stored within a payload.

* * * * *